United States Patent
Davis

(10) Patent No.: US 9,338,283 B1
(45) Date of Patent: *May 10, 2016

(54) REDUCTION IN NETWORK CONGESTION

(71) Applicant: West Corporation, Omaha, NE (US)

(72) Inventor: Douglas L. Davis, Murphy, TX (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,829

(22) Filed: Apr. 20, 2015

Related U.S. Application Data

(63) Continuation of application No. 14/105,644, filed on Dec. 13, 2013, now Pat. No. 9,014,352.

(51) Int. Cl.
  H04M 15/00 (2006.01)
  H04M 3/36 (2006.01)
  H04M 3/436 (2006.01)

(52) U.S. Cl.
  CPC ............. *H04M 3/367* (2013.01); *H04M 3/436* (2013.01)

(58) Field of Classification Search
  CPC ....... H04L 47/11; H04L 47/122; H04L 47/10; H04L 65/1069; H04L 29/06326; H04L 47/29; H04L 47/822; H04L 65/1066; H04M 2201/12; H04M 3/38
  USPC .................. 379/111, 112.01, 112.04, 112.05, 379/112.06, 112.08, 112.1, 133, 134, 379/137.139, 221.01, 221.03, 221.05, 379/221.06; 370/229, 236, 237, 252
  See application file for complete search history.

(56) References Cited

U.S. PATENT DOCUMENTS

| | | | |
|---|---|---|---|
| 5,544,152 A | 8/1996 | Obermanns et al. | |
| 7,817,789 B2 | 10/2010 | Ferguson et al. | |
| 8,363,552 B2 | 1/2013 | Wiley | |
| 8,413,238 B1 * | 4/2013 | Sutton ............................ | 726/23 |
| 2002/0057649 A1 | 5/2002 | Kinnunen | |
| 2007/0280463 A1 | 12/2007 | Kouchri et al. | |
| 2008/0310604 A1 | 12/2008 | Agarwal et al. | |
| 2009/0113482 A1 | 4/2009 | Kawada et al. | |
| 2010/0149987 A1 | 6/2010 | Wiley | |
| 2011/0293080 A1 | 12/2011 | Katakura et al. | |
| 2012/0027191 A1 | 2/2012 | Baril et al. | |
| 2014/0273982 A1 | 9/2014 | Faliero et al. | |

* cited by examiner

*Primary Examiner* — Binh Tieu
(74) *Attorney, Agent, or Firm* — Raffi Gostanian

(57) ABSTRACT

A system, method and non-transitory computer readable storage medium comprising instructions that when read by a processor perform receiving a telephony connection request, determining addressing information regarding the telephony connection request, the addressing information including at least routing information or a phone number, determining traffic information regarding the telephony connection request based on the addressing information, the traffic information including previous telephony connection requests, sending a reply in response to the telephony connection request, wherein: forwarding the telephony connection request to an intended recipient would result in a system response, and the reply differs from the system response.

20 Claims, 14 Drawing Sheets ns of the system configured to examine and record con-
REDUCTION IN NETWORK CONGESTION

CROSS-REFERENCE TO RELATED APPLICATIONS

This application is a continuation from U.S. patent application Ser. No. 14/105,644, filed Dec. 13, 2013, entitled "REDUCTION IN NETWORK CONGESTION", the entire contents of which is incorporated by reference herein in its entirety.

FIELD

The present disclosure relates generally to telephony and, more particularly, to reduction in network congestion.

BACKGROUND

Network congestion typically occurs when a link or node is carrying so much data that its quality of service deteriorates. Typical effects include queuing delay, packet loss or the blocking of new connections. Consequences of these effects include that incremental increases in offered load lead either only to small increases in network throughput, or to an actual reduction in network throughput. As such, what is needed are solutions to overcome these effects.

SUMMARY

The instant application discloses a system, method and non-transitory computer readable storage medium comprising instructions that when read by a processor perform receiving a telephony connection request, determining addressing information regarding the telephony connection request, the addressing information including at least routing information or a phone number, determining traffic information regarding the telephony connection request based on the addressing information, the traffic information including previous telephony connection requests, sending a reply in response to the telephony connection request, wherein: forwarding the telephony connection request to an intended recipient would result in a system response, and the reply differs from the system response.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
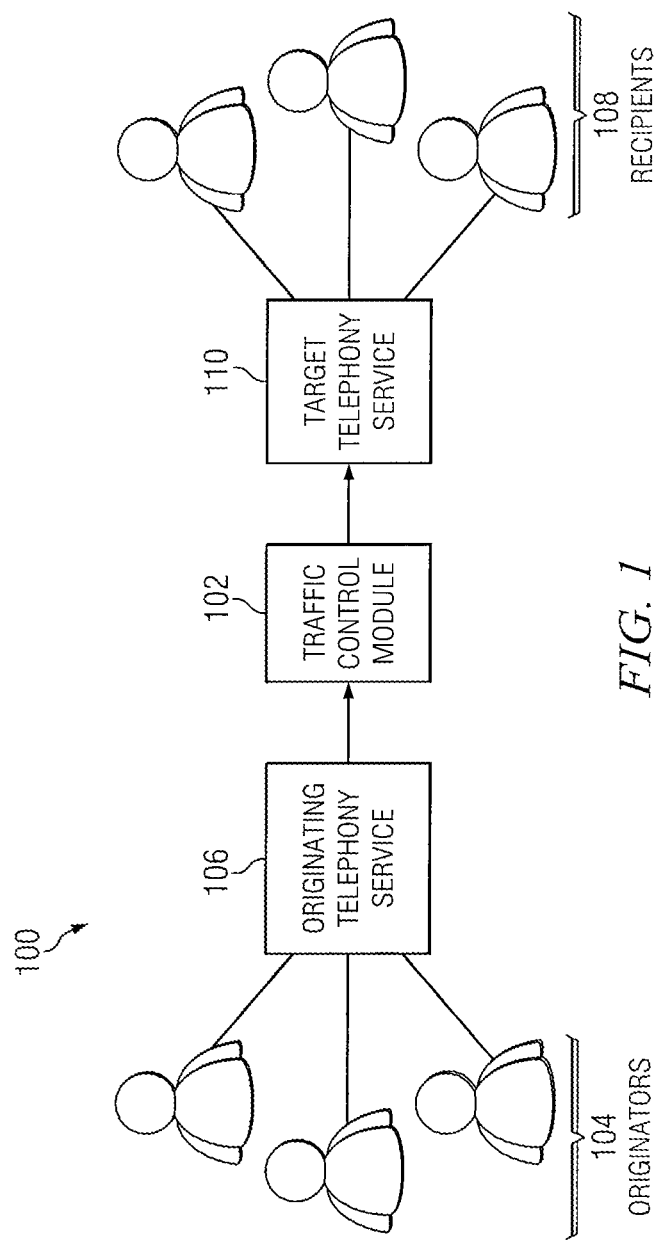
FIG. 1 is an illustration of an example embodiment of a system for reduction in network congestion in telephony systems.

FIG. 1 is an illustration of an example embodiment of a system 100 for reduction in network congestion in telephony systems. System 100 may include a traffic control module 102 configured to analyze telephony messages being sent from one or more originators 104, originating from an originating telephony service 106, to one or more recipients 108 on a target telephony service 110. System 100 may be configured to intercept, process, or otherwise handle connection requests originating from originators 104 to ultimately be delivered to recipients 108. Traffic control module 102 may be configured to determine whether to forward such connection requests in an attempt to reduce network congestion. To facilitate such a determination, traffic control module 102 may be configured to record information about the connections between originators 104. Based on such recorded information and/or a given connection request, traffic control module 102 may be configured to make determinations such as whether connection requests from originators 104 indicate automatic dialing operations, whether connection requests from originator 104 violate defined policies, or whether connection requests from originator 104 will be unsuccessful. Based on these determinations, traffic control module 102 may be configured to, for example, forward the received connection requests, deny connection requests, spoof replies, or redirect connections to alternative paths.

Traffic control module 102 may be implemented by, for example, an application, function, server, computer, process, executable, shared library, script, or any other suitable entity. Traffic control module 102 may be implemented on, for example, on an electronic device such as a computer, transmitter, server, switch, private branch exchange ("PBX"), or gateway, or on an electronic device communicatively coupled to a computer, transmitter, server, switch, PBX, or gateway. In one embodiment, traffic control module 102 may be implemented on a gateway or on an electronic device communicatively coupled to a gateway configured to bridge telephony traffic between originating telephony service 106 and target telephony service 110. Traffic control module 102 may reside or be communicatively coupled to a device residing within the routing path between originators 104 and recipients 108. In one embodiment, traffic control module 102 may reside or be communicatively coupled to a device at a point between the switching of transmission segments, service segments, networks, subnetworks, or service providers.

Originating telephony service 106 may be configured to provide access for telephony messages for the full or partial route between originators 104 and traffic control module 102. Target telephony service 106 may be configured to provide access for telephony messages for the full or partial route between traffic control module 102 and recipients 108. Each of target telephony service 106 and originating telephony service 104 may include any suitable combination of telecommunications or telephony equipment, servers, routers, exchanges, repeaters, amplifiers, transmission lines, subnetworks, or other suitable entities configured to provide target telephony service 106 and originating telephony service 104. In one embodiment, target telephony service 106 and originating telephony service 104 may be configured to provide different portions of a network for the same service. In another embodiment, target telephony service 106 and originating telephony service 104 may be configured to provide portions of networks for different services. The service provided by target telephony service 106 and originating telephony service 104 may include, for example, service-initiated protocol ("SIP") services, short-message-system ("SMS") services, fax services, data services, voice-over-internet-protocol services, wireless communication services of any suitable protocol or company, or public switched telephone network ("PSTN") services. In various embodiments, originators 104 and recipients 108 may be addressable by telephone numbers.

Originators 104 may be implemented fully or in part by, for example, caller 218, texter 222, texter 346, caller 348, caller 350, sender 572, sender 688, or sender 688 of FIGS. 2-3 and 5-7, or any combination thereof. Originating telephony service 106 may be implemented fully or in part by, for example, voice service 220, text service 224, network device 352, network device 574, network device 690, or source network 818 of FIGS. 2-3 and 5-8, or any combination thereof. Target telephony service 110 may be implemented fully or in part by, for example, PSTN service 228, wireless service 232, network device 354, target network 576, network device 692, target service network 706, network device 708, network device 711, target service network 806, network device 834, or network device 838 of FIGS. 2-3 and 5-8, or any combination thereof. Recipients 108 may be implemented fully or in part by, for example, PSTN recipient 226, wireless recipient 230, recipient 356, recipient 358, recipient 360, recipient 694, recipient 710, recipient 713, recipient 832, recipient 836, or recipient 840 of FIGS. 2-3 and 5-8, or any combination thereof.

In one embodiment, originating telephony service 106 may be configured to provide SIP service and target telephony service 110 may be configured to provide PSTN services. In such an embodiment, traffic control module 102 may reside at or be communicatively coupled to a gateway configured to exchange messages between an SIP network and a PSTN network.

System 100 may be configured to transmit any suitable messages relating to any suitable kind of telephony traffic between originators 104 and recipients 108, such as voice, text, or fax telephony traffic. Such traffic may be initiated by originators 104 in an attempt to contact recipients 108.

Traffic control module 102 may be configured to monitor and record traffic or attempted traffic between originators 104 and recipients 108. Accordingly, traffic control module 102 may be configured to examine and record requests from originators 104, responses from recipients 108, the duration of any connections established, and any errors arising from attempted connections. In addition, traffic control module 102 may be configured to access sources of information about originators 104, recipients 108, originating telephone service 106, or target telephone service 110.

Upon interception or receipt of a request for a new connection to be forwarded to recipients 108, traffic control module 102 may be configured to determine whether or not to forward the request. Traffic control module 102 may be configured to make such a determination in order to reduce network congestion on, for example, target telephony service 110. Reduction of network congestion may be accomplished by, for example, configuring traffic control module 102 to not forward the request if, for example, the request would eventually be unsuccessful, if the request is associated with behavior indicative of an auto-dialer, or if the request violates a specified policy of one of the network services. In order to determine whether any such condition exists, traffic control module 102 may be configured to examine, for example, the request, the identify of the originators 104 or recipients 108, originating telephony service 106, any equipment on the route between originators 104 and traffic control module 102, target telephony service 110, any equipment on the route between traffic control module 102 and recipients 108, information recorded regarding prior attempts to establish connections between originators 104 and recipients 108, or third-party information.

Connection requests to be sent to recipients 108 that are likely to fail or result in only short connection sessions may be expensive in terms of overhead and system resources for target telephony service 110 to fulfill. Target telephony service 110 may be unable to receive compensation for such requests or sessions sufficient to recoup the resources expended attempting to establish such requests or sessions. In addition, such requests or sessions may needlessly cause congestion on target telephony service 110 or for recipients 108. Consequently, traffic control module 102 may be employed by or provide service for target telephony service 110 to reduce network congestion by determining whether to forward requests on to target telephony service 110. Originating telephony service 106 may experience similar overhead or expense in providing the requests or connections to target telephony service 110. Consequently, traffic control module 102 may be employed by or provide service to originating telephony service 106 to reduce the number of requests forwarded on behalf of originating telephony service 106.

In one embodiment, a source of network congestion to be reduced by system 100 may include, for example, autodialers, robodialers, voice broadcasters, predictive dialers, or power dialers. Such entities may repeatedly dial phone numbers or send text or fax messages to phone numbers in an attempt to reach many recipients 108. Such behavior may increase network congestion. The behavior may be undesirable if, for example, such attempts result in errors related to establishing connections or in a connection that lasts only a short period of time. Traffic control module 102 may be configured to analyze traffic and requests to determine whether such traffic and requests originate from one or more autodialers or similar entities in originators 104.

Figure 2:
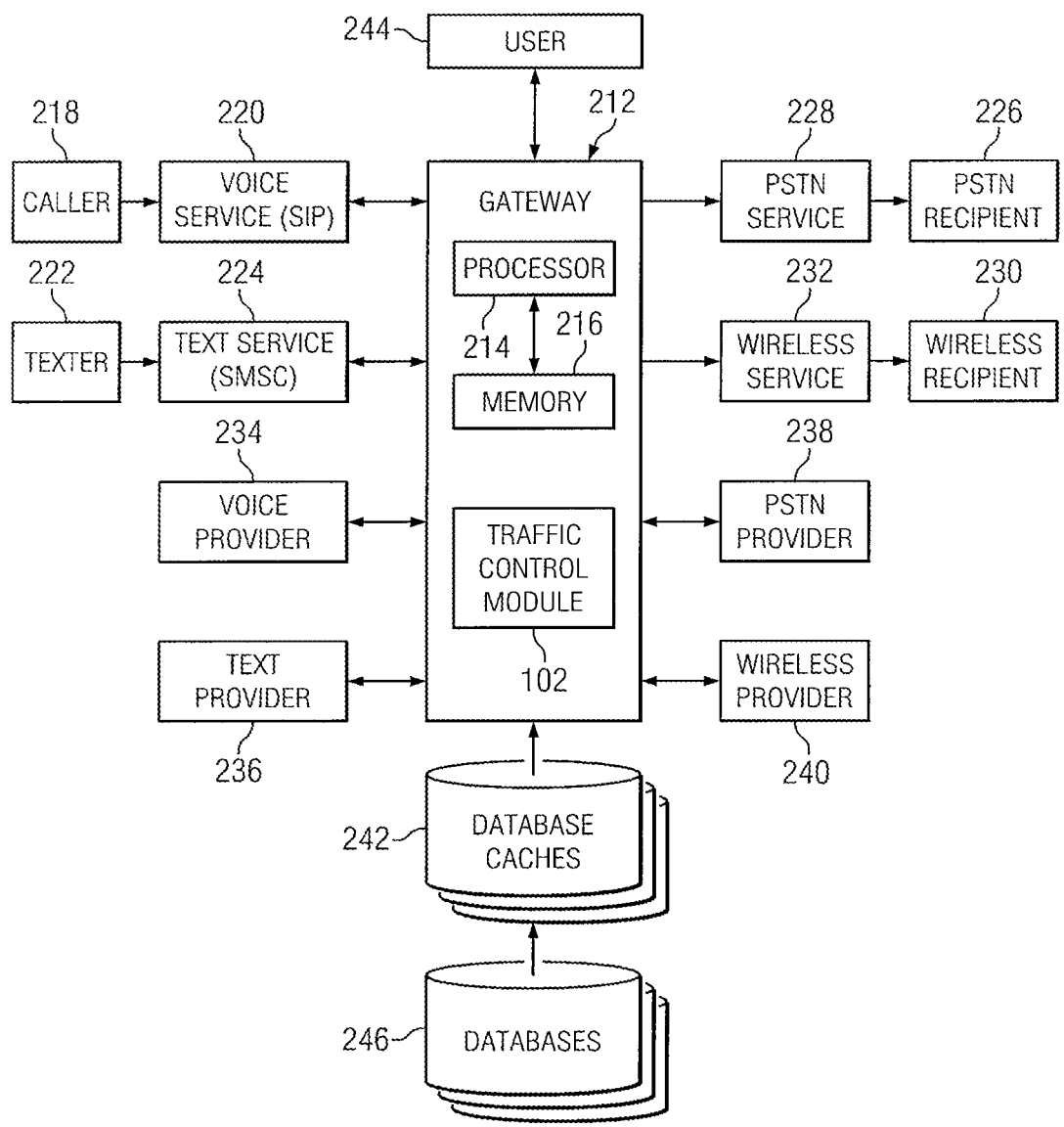
FIG. 2 is a more detailed illustration of example embodiments of the system for reduction in network congestion in telephony systems.

FIG. 2 is a more detailed illustration of example embodiments of system 100 for reduction in network congestion in telephony systems.

Originators 104 may include, for example, caller 218 or texter 222. Originating telephony system 106 may be implemented by, for example, voice service 220 and/or text service 224. Voice service 220 may be provided by voice provider 234. Text service 224 may be provided by text provider 236. Target telephony system 106 may be implemented by, for example, public switched telephone network ("PSTN") service 228 or wireless service 232. PSTN service 228 may be provided by PSTN provider 238. Wireless service 232 may be provided by wireless provider 240. Recipients 108 may include, for example, PSTN recipient 236 or wireless recipient 230.

Caller 218 may include an electronic device configured to make connection attempts and establish connections for voice communication with a recipient. Caller 218 may be identified, for example, by a telephone number and may make such attempts using a telephone number of a recipient. Caller 218 may be configured to make such communication using one or more service providers such as voice service 220. Voice service 220 may include telecommunications or telephony equipment, servers, routers, exchanges, repeaters, amplifiers, transmission lines, subnetworks, or other suitable entities configured to provide requests or traffic containing voice traffic. Voice service 220 may be configured to transmit connection attempts or subsequent communication to gateway 212 or another device communicatively coupled to traffic control module 102.

Texter 222 may include an electronic device configured to make connection attempts and establish connections for text communications, such as SMS texts, with a recipient. Texter 222 may be identified, for example, by a telephone number and may make such attempts using a telephone number of a recipient. Texter 222 may be configured to make such communication using one or more service providers such as text service 224. Text service 224 may include telecommunications or telephony equipment, servers, routers, exchanges, repeaters, amplifiers, transmission lines, subnetworks, or other suitable entities configured to provide requests or traffic containing text traffic. Text service 224 may be configured to transmit connection attempts or subsequent communication to gateway 212 or another device communicatively coupled to traffic control module 102.

PSTN recipient 226 may include an electronic device configured to receive voice, text, or other telephony communications from, for example, caller 218 or text 222. PSTN recipient 226 may include a land-based recipient of telephony traffic. PSTN recipient 226 may be identified, for example, by a telephone number. PSTN recipient 226 may be configured to receive such communication using one or more service providers such as PSTN service 228. PSTN service 228 may include telecommunications or telephony equipment, servers, routers, exchanges, repeaters, amplifiers, transmission lines, subnetworks, or other suitable entities configured to provide requests or traffic containing telephony traffic to PSTN recipient 226. PSTN service 224 may be configured to transmit connection attempts or subsequent communication from gateway 212 or another device communicatively coupled to traffic control module 102.

Wireless recipient 230 may include an electronic device configured to receive voice, text, or other telephony communications from, for example, caller 218 or text 222. Wireless recipient 230 may include a wireless recipient of telephony traffic. Wireless recipient 230 may be identified, for example, by a telephone number. Wireless recipient 230 may be configured to receive such communication using one or more service providers such as wireless service 232. Wireless service 232 may include telecommunications or telephony equipment, servers, routers, exchanges, repeaters, amplifiers, transmission lines, subnetworks, or other suitable entities configured to provide requests or traffic containing telephony traffic to wireless recipient 230. Wireless service 232 may be configured to transmit connection attempts or subsequent communication from gateway 212 or another device communicatively coupled to traffic control module 102.

System 100 may include database caches 242 communicatively coupled to databases 246. Database caches 242 may be communicatively coupled to traffic control module 102. Database caches 242 may be configured to repackage, reconfigure, or provide access to information in databases 246 to traffic control module 102. Databases 246 may include information not typically accessible in real-time as required by traffic control module 102. Furthermore, databases 246 may not package information as required by traffic control module 102. Databases 246 may not be within the control of system 100 or of traffic control module 102. Thus, direct access of databases 246 may not be possible or may be insufficient for traffic control module 102 to perform the functionality described herein. Database caches 242 may include one or more adapters, interfaces, or other mechanisms to provide real-time access of information similar to databases 246 in a format usable to traffic control module 102. Such mechanisms may repackage the information. In one embodiment, some of databases 246 may be accessible directly by traffic control module 102. Databases 246 or database caches 242 may include, for example, databases containing information related to: equipment within services such as voice service 220, PSTN service 228, text service 224, or wireless service 232; equipment of recipients or originators such as caller 218, texter 222, PSTN recipient 226, or wireless recipient 230; a history of connections, attempted connections, and errors between originators and recipients; billing numbers of originators such as caller 218 or texter 222; do-not-call ("DNC") lists; portability of phone numbers of recipients such as PSTN recipient 226 or wireless recipient 230; caller identification information; address information; or home or virtual location registers of recipients. Traffic control module 102 may be configured to access databases 246 or databases 242 by the configuration and operation as shown, for example, in FIGS. 3-8.

System 100 may include a user 244 communicatively coupled to traffic control module 102. User 244 may include software, applications, servers, processes, devices, or other suitable mechanisms for presenting the control, use, and results of system 100 to a user. User 244 may include a user interface for visualizing the operation of system 100 and for inputting values or controls for the operation of system 100. Such controls may include, for example, thresholds for determining that the connections or requests handled by system 100 originate from auto-dialers or contribute to excessive network congestion. Further, the controls may include an identification of one or more service providers (such as voice provider 234, text provider 236, PSTN provider 238, or wireless provider 240) for which traffic control module 102 may provide reduction of network congestion. User 244 may include a human administrator to manually control or a machine configured to automatically control the operation of system 100.

Traffic control module 102 may reside on an electronic device such as a computer, transmitter, server, switch, private branch exchange ("PBX"), or gateway, or on an electronic device communicatively coupled to a computer, transmitter, server, switch, PBX, or gateway. Such an electronic device may include a processor 214 coupled to a memory 216. Traffic control module 102 may include instructions logic resident in memory 216 for execution by processor 214. In one embodiment, traffic control module 102 may reside on a gateway 212.

Processor 214 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 214 may interpret and/or execute program instructions and/or process data stored in memory 216. Memory 216 may include any system, device, or apparatus configured to hold and/or house one or more memory modules. Each memory module may include any system, device or apparatus configured to retain program instructions and/or data for a period of time (e.g., computer-readable media).

Gateway 212 may be configured to transfer traffic from voice service 220 or text service 224 on to, for example, PSTN service 228 or wireless service 232. In one embodiment, voice service 220 may be configured to provide information through Session-Initiated Protocol ("SIP"). Thus, gateway 212 may be configured as an SIP-PSTN or an SIP-Wireless gateway. In another embodiment, text service 224 may include a short-message-service center ("SMSC"). Thus, gateway 212 may be configured as an SMSC-PSTN or an SMSC-Wireless gateway.

Traffic control module 102 may be communicatively coupled to one or more of voice provider 234, text provider 236, PSTN provider 238 or wireless provider 240. Traffic control module 102 may be configured to receive instructions such as operational parameters from such providers. The operational parameters may include, for example, thresholds for determining whether requests or connections between originators and recipients is indicative of auto-dialing or excessive network usage, checks to made upon connection requests, or mechanisms of denying a connection request. Traffic control module 102 may be configured send information regarding blocked or allowed requests to the providers.

In operation, traffic control module 102 may be executing on gateway 212 or on an electronic device communicatively coupled to gateway 212. Traffic control module 102 may receive input regarding analysis to be run on received traffic, thresholds to apply during the analysis, or other information from user 244 or one or more of voice provider 234, text provider 236, PSTN provider 238, or wireless provider 240. Traffic control module 102 may monitor intercepted connection requests or communication at gateway 212 or another suitable point between the originators and recipients of system 100.

Caller 218 or texter 222 may initiate communication with PSTN recipient 226 or wireless recipient 230. The communication may include a connection request as part of, for example, voice or text communication. The communication may be transmitted through voice service 220 or text service 224 and arrive at gateway 212.

Traffic control module 102 may detect the connection request and subsequent communication. Traffic control module 102 may store details regarding the connection request and subsequent communication in a suitable database, record, file or other mechanism. Such details may include, for example, the identity of caller 218, texter 222, PSTN recipient 226, or wireless recipient 230, the identity of equipment in voice service 220, text service 224, PSTN service 228, or wireless service 232, the length of any connections established, or any errors determined in attempting such connections.

To determine whether or not to forward the connection request to PSTN service 228 or wireless service 232, traffic control module 102 may access information such as those accessible through database caches 242 or databases 246. Traffic control module 102 may use such information in conjunction with the identity of caller 218, texter 222, PSTN recipient 226, or wireless recipient 230, the identity of equipment in voice service 220, text service 224, PSTN service 228, or wireless service 232.

In one embodiment, traffic control module 102 may determine whether or not the traffic from caller 218, voice service 220, texter 222, or text service 224 to PSTN service 228, PSTN recipient 226, wireless service 232, or wireless recipient 230 indicates excessive telephony traffic. In a further embodiment, traffic control module 102 may make such a determination by analyzing whether the requests between a specific combination of such entities exceeds a specified threshold, a number of failed such attempts exceeds a specified threshold, a number of such attempts has resulted in a number of short-duration connections that exceed a specified threshold, or any combination thereof. If such thresholds are exceeded, traffic control module 102 may determine that network congestion may be reduced by, for example, throttling requests from a given originator or service. Such a determination may include determining that caller 218 or texter 222 is engaged in autodialing. Such an embodiment may be implemented by, for example, the configuration and operation illustrated in FIGS. 3-4.

In another embodiment, traffic control module 102 may determine whether or not a connection request is associated with an attempted communication that violates specified policy. Such policies may be defined by user 244 or a provider service for which traffic control module 102 is operating. The policies may include, for example, enforcing a DNC list or requiring that a billing phone number match the phone number represented by a connection request. Violating such a policy may cause traffic control module 102 to, for example, deny the request or further throttle requests from the given originator. Such an embodiment may be implemented by, for example, the configuration and operation illustrated in FIGS. 5-6.

In yet another embodiment, traffic control module 102 may determine whether or not a connection request is likely to be fulfilled once forwarded to, for example, PSTN service 228 or wireless service 232. The connection request is likely to not be fulfilled if, for example, the connection request is made to an invalid number or is made to a wireless device that is not active and available to receive the request. If such a request is not likely to be fulfilled, traffic control module 102 may, for example, deny the request or further throttle requests from the given originator. Such an embodiment may be implemented by, for example, the configuration and operation illustrated in FIGS. 7-8.

If traffic control module 102 has not denied the connection request, it may forward the connection request to PSTN service 228 or wireless service 232, as appropriate. The request may be forwarded to recipients such as PSTN recipient 226 or wireless recipient 230.

Traffic control module 102 to communicate the results of analyzing received requests to a service provider such as one or more of voice provider 234, text provider 236, PSTN provider 238, or wireless provider 240. Traffic control module 102 may deny or throttle connection requests of behalf of such a service provider. Thus, traffic control module 102 may limit network congestion entering, for example, PSTN service 228 or wireless service 232, or network congestion issued by voice service 220 or text service 224. In one embodiment, traffic control module 102 may invoice voice provider 234, text provider 236, PSTN provider 238, or wireless provider 240 for blocked network congestion.

Further, traffic control module 102 may communicate the results of analyzing received to user 244. Traffic control module 102 may present its traffic congestion results in a visualizer interface.

Figure 3:
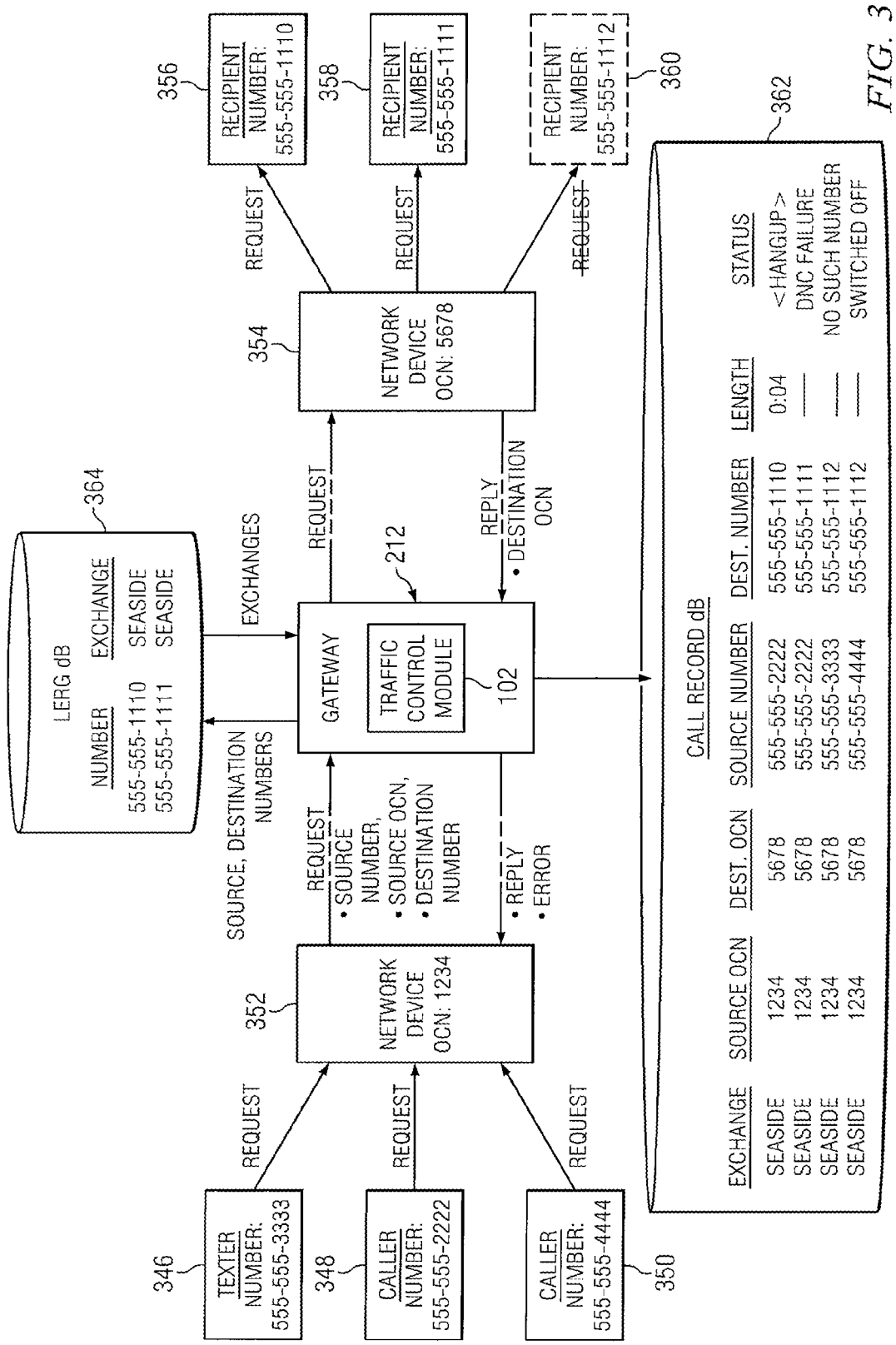
FIG. 3 is a more detailed illustration of example embodiments of the system configured to examine and record connection information for use in determining network congestion conditions.

FIG. 3 is a more detailed illustration of example embodiments of system 100 configured to examine and record connection information for use in determining network congestion conditions.

In one embodiment, system 100 may include a call record database 362 configured to store information regarding attempted and established connections. Call record database 362 may be implemented in, for example, a record, file, database, or any other suitable mechanism. Traffic control module 102 may be communicatively coupled to call record database 362 and may be configured to populate and access call record database 362. Any suitable information may be included in call record database 362 to identify a connection request or established connection. For example, call record database 362 may contain indications of an originator, equipment used in transmitting the traffic from the originator, a recipient, equipment used in transmitting the traffic to the recipient, connection length, or status. Any suitable indications of equipment used to transmit the traffic from the originator may be used, including an identifier such as a source operating carrier number ("OCN") or a source number. Any suitable indications of equipment used to transmit the traffic to the recipient may be used, including a destination OCN, a destination number, or an exchange identifier. An OCN may include a four-digit identifier used to identify a service provider local to the originator or recipient. An exchange identifier may include an identifier of a local telephony exchange such as a PBX through which communication to the recipient is routed. A source or destination number may include a phone number. Status indications may include an outcome from an attempted connection, such as whether a connection was made or an error that was encountered. Such indications may include, for example, an indication that a connection failed a DNC check, a number validity check, an anti-spoofing check, or a check to determine whether a destination device is online and active. Length indications may indicate for how long a connection was established. If the length of a given recorded connection does not reach a minimum threshold, traffic control module 102 may be configured to record such a connection as a "hang-up," wherein it is assumed that the short duration of the connection was due to a recipient hanging up soon after receiving a call. Such a minimum threshold may be set by, for example, a user of system 100 or a service provider employing the use of traffic control module 102.

Traffic control module 102 may be configured to store the results of an attempted connection or connection requests in call record database 362. Further, traffic control module 102 may be configured to access call record database 362 to determine information about past connection requests.

Texter 346, caller 348, and caller 350 may implement fully or in part originators 104, caller 218 and/or texter 222 of FIGS. 1-2. Texter 346, caller 348, and caller 350 may be included within a single phone bank. Recipient 356, recipient 358, and recipient 360 may implement recipients 108, PSTN recipient 226, and/or wireless recipient 230 of FIGS. 1-2. Texter 346, caller 348, caller 350, recipient 356, recipient 358, and recipient 360 may include an identifying phone number. Texter 346 may attempt to make a connection request with one or more of recipient 356, recipient 358, or recipient 360 to send, for example, an SMS text message. Caller 348 and caller 350 may attempt to make a connection request with one or more of recipient 356, recipient 358, or recipient 360 to send, for example, voice traffic.

Network device 352 may implement one portion of, for example, originating telephony service 106, voice service 220, and/or text service 224 of FIGS. 1-2. Network device 354 may implement one portion of, for example, target telephony service 110, PSTN service 228, and/or wireless service 232 of FIGS. 1-2. Network device 354 and network device 352 may include an identifier. Such an identifier may include, for example, a four-digit OCN. Network device 352 may be configured to forward connection requests and traffic originating from, for example, texter 346, caller 348, or caller 350 to gateway 212. Network device 354 may be configured to forward connection requests and traffic sent from gateway 212 to, for example, recipient 356, recipient 358, or recipient 360. Further, network device 354 may be configured to forward reply messages originating from recipient 356, recipient 358, or recipient 360 to, for example, texter 346, caller 348, or caller 350 via gateway 212.

Traffic control module 102 operating in, for example, gateway 212, may be configured to populate call record database 362 with information determined from examining intercepted traffic and/or accessing information from other sources. For example, traffic control module 102 may be configured to examine connection requests as they are received from the originators. Traffic control module 102 may be configured to analyze the contents of the connection request to determine any suitable information contained therein for populating call record database 362. In a further example, traffic control module 102 may be configured to determine phone numbers associated with originator of the request such as texter 346, caller 348, or caller 350, or identifiers of equipment in the service which forwarded the request such as the OCN of network device 352. Some information regarding the recipients of the request may be available in the connection request. Traffic control module 102 may be configured to determine destination phone numbers such as those associated with recipient 356, recipient 358, or recipient 360 from the connection request. In one embodiment, information regarding equipment in the target service such as network device 354 may be available in the connection request. In another embodiment, such information may be accessible by accessing database caches or databases, or by examining reply messages.

In another example, traffic control module 102 may be configured to examine replies to connection requests as they are received from the recipients in order to populate call record database 362. Traffic control module 102 may be configured to analyze the contents of the connection request to determine any suitable information contained therein for populating call record database 362. Traffic control module 102 may be configured to determine phone numbers of recipient 356, recipient 358, or recipient 360 from a reply message. Further, traffic control module 102 may be configured to determine the identity of equipment relaying traffic to the recipients such as the OCN of network device 354 from the reply message. In addition, traffic control module 102 may be configured to determine the status of the connection request by examining the reply message. In a further example, the reply message may include an indication that the connection was accepted, or that a particular error occurred. Such errors may include, for example, indications that the recipient was not valid, was not active, or was not registered.

In yet another example, traffic control module 103 may be configured to access other sources of information, such as database caches or databases, to determine information to populate call record database 362. Traffic control module 102 may be configured to access any suitable source of information. In one embodiment, traffic control module 102 may be configured to access a database containing information on network equipment to transport traffic between originators and recipients. For example, traffic control module 102 may be configured to access Local Exchange Routing Guide ("LERG") database 364. LERG database 364 may include information concerning OCNs, company names, exchanges, account type—such as mobile, landline, or fax—or other equipment. Such information may be indexed according to a phone number. Traffic control module 102 may determine an OCN or exchange associated with a given originator or recipient based on the phone numbers determined from the connection request.

Traffic control module 102 may be configured to forward any suitable information to the originators in response to the connection request. If a reply is received from the recipient, traffic control module 102 may be configured to forward the reply to the originators. Such a reply may include an error. In one embodiment, if traffic control module 102 determines that the connection request would result in an error, violates a policy of a service provider, or would cause network congestion, traffic control module 102 may be configured to forward a spoofed reply to the originators. A spoofed reply may include a response which is different from the reply which would be received from the intended recipient if the connection request had been sent. The spoofed reply may include messages indicating, for example, a busy signal, a number not in service signal, a phone ringing, a voicemail signal, or a signal indicating a phone ringing without an answer. The spoofed reply may be configured to cause the originator to perceive that the recipient has received the connection request and is processing the connection request. Such a perception may be caused by a spoofed delay. In addition, the spoofed reply may be configured to cause the originator to perceive that there has been no response from the intended recipient. The spoofed reply may be in contrast to the reply which would have been sent if the connection request had been sent and received by the intended recipient. For example, the spoofed reply may be sent instead of a successful connection request, a "fast-busy" signal indicating overload, or a signal indicating not a working number.

In operation, traffic control module 102 may be operating in system 100 to analyze traffic between originators such as texter 346, caller 348, and caller 350 and recipients such as recipient 356, recipient 358, or recipient 360. Texter 346 may have a phone number of 555-555-3333. Caller 348 may have a phone number of 555-555-2222. Caller 350 may have a phone number of 555-555-4444. Caller 348 and caller 350 may be operating in conjunction in a call center. Recipient 356 may have a phone number of 555-555-1110. Recipient 358 may have a phone number of 555-555-1111. Recipient 360 may have a phone number of 555-555-1112. Caller 348 may attempt to call recipient 356 and recipient 358. Texter 346 may attempt to text recipient 360. Caller 350 may attempt to call recipient 360. Recipient 360 may be, for example, nonexistent or a mobile device that is switched off.

Texter 346, caller 348, or caller 350 may send their request through equipment such as network device 352. Network device 352 may have an OCN of "1234." Network device 352 may forward the request received to gateway 212.

Once a request has been received by gateway 212, traffic control module 102 may examine the request for associated information. For example, the phone numbers of texter 346, caller 348, or caller 350 may be recorded in call record database 362. In one embodiment, traffic control module 102 may examine LERG database 364 to determine the associated OCN of texter 346, caller 348, or caller 350 based on the originator's phone number. In another embodiment, the OCN associated with texter 346, caller 348, or caller 350 may be included within the request. The OCN "1234" associated with network device 352 may be recorded as a source OCN in association with the originator's phone number as a source phone number in call record database 362.

Traffic control module 102 may examine the request for a destination phone number associated with, for example, recipient 356, recipient 358, or recipient 360. Traffic control module 102 may record the destination phone number in call record database 362 and associate it with the source phone number from the request. In one embodiment, traffic control module 102 may examine LERG database 364 to determine the OCN of network equipment associated with the recipient. Traffic control module 102 may examine the LERG database 364 using the destination phone number as an index. In another embodiment, traffic control module 102 may determine the OCN from a subsequent reply. Traffic control module 102 may record "5678," the OCN associated with network device 354, which may be associated with the recipients. In yet another embodiment, traffic control module 103 may access LERG database 364 to determine an identifier of a local exchange for the recipient. Such an identifier may indicate a geographic local area for the recipient. For example, the local exchange for the recipients may be identified as "Seaside." Traffic control module 103 may look up such information using the destination phone number as an index.

Traffic control module 103 may determine a status resulting from the connection request. Traffic control module 103 may determine such a status in any suitable manner. In one embodiment, traffic control module 103 may determine the status by accessing one or more databases or other sources of information. For example, traffic control module 103 may access databases to determine whether the connection request is made from an autodialer, exceeds allowable network congestion limits, violates a DNC policy, an anti-spoofing policy, is made to a nonexistent number, or is made to a mobile device that is switched off or not registered. In another embodiment, traffic control module 103 may receive a status in a reply returned from a recipient or related network equipment.

For example, a connection request between caller 348 and recipient 356 may result in a voice connection. Traffic control module 103 may record such a result in call record database 362. The duration of the connection may be recorded. In one embodiment, if the connection is established for less than a threshold amount of time, traffic control module 103 may characterize the connection as resulting in a hang-up. Traffic control module 102 may record the determined result in call record database 362 in association with the connection request.

In another example, a connection request between caller 348 and recipient 358 may result in a failure to connect because recipient 358 is listed in a DNC list. Typical DNC list enforcement is conducted before a call is placed. Traffic control module 102 may conduct the check against DNC resources and deny the connection request without forwarding the connection request to recipient 358. Traffic control module 102 may record the determined result in call record database 362 in association with the connection request.

In yet another example, a connection request between texter 346 and recipient 360 may result in a failure to connect because the phone number of recipient 360 is invalid. Traffic control module 102 may conduct a check to determine whether the phone number of recipient 360 is valid and deny the connection request without forwarding the connection request to recipient 360. Traffic control module 102 may record the determined result in call record database 362 in association with the connection request.

In still yet another example, a connection request between caller 350 and recipient 360 may result in a failure to connect because recipient 360 is inactive or switched off. Traffic control module 102 may conduct a check to determine whether the recipient 360 is inactive or switched off and deny the connection request without forwarding the connection request to recipient 360. Traffic control module 102 may record the determined result in call record database 362 in association with the connection request.

If the connection request has generated a reply from the recipient, the reply may be forwarded to the originator. In one embodiment, if traffic control module 102 determines that the connection request should be denied, traffic control module 102 may cause a spoofed reply to be forwarded to the originator.

Figure 4:
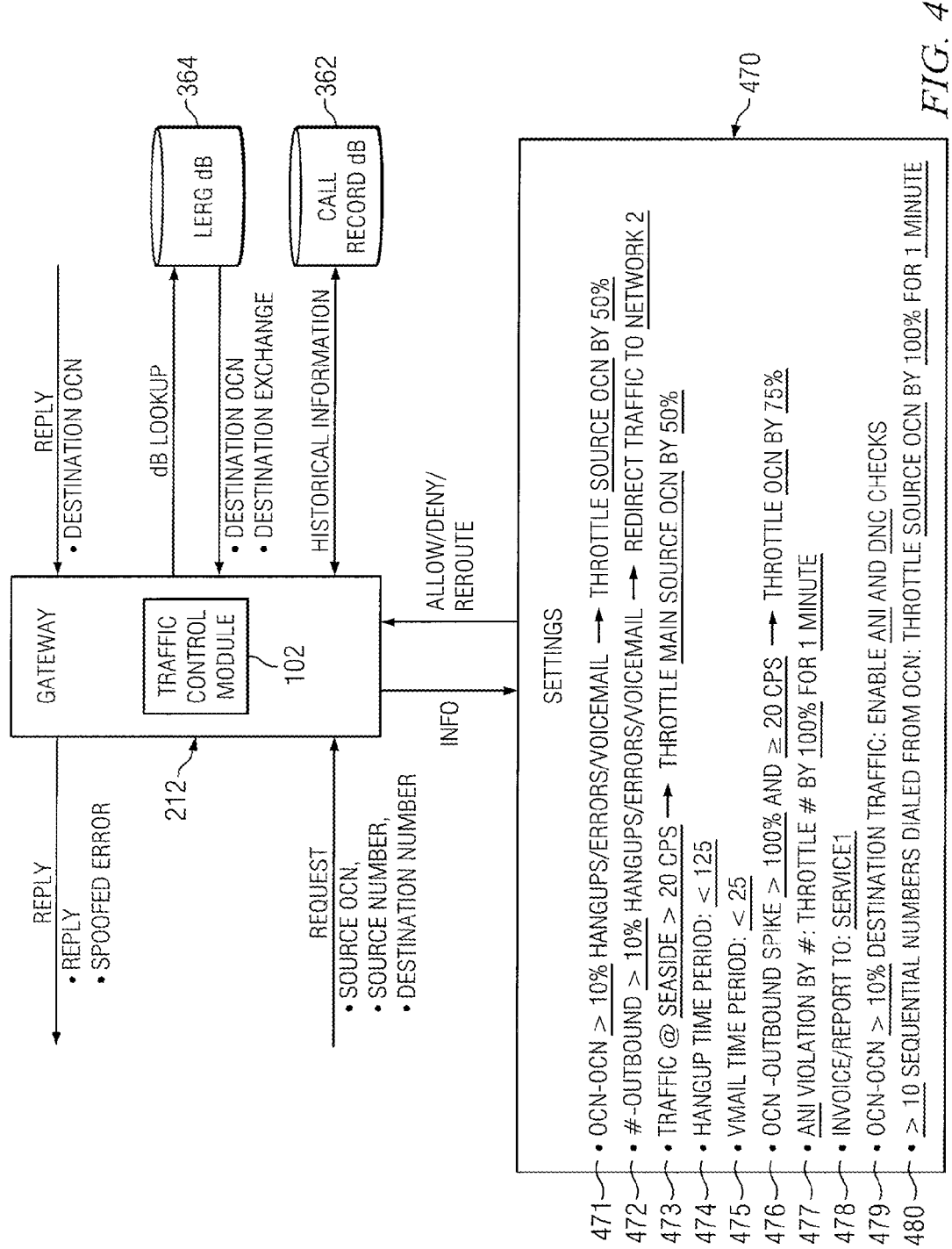
FIG. 4 is a more detailed illustration of example embodiments of the system configured to determine network congestion.

FIG. 4 is a more detailed illustration of example embodiments of system 100 configured to determine network congestion.

System 100 may include settings 470 configured to provide information for traffic control module 102 to determine whether network congestion exists or is likely given a new connection request. Settings 470 may be implemented in a file, database, record, or any other suitable mechanism. Settings 470 may be set by, for example, a user of system 100 or a service provider for which traffic control module 102 is reducing network congestion. Settings 470 may include any suitable criteria, test, threshold, or other mechanism of evaluating network congestion. Settings 470 may contain criteria identifying a particular aspect of telephony traffic or connection requests. Further, settings 470 may include criteria identifying a threshold of such aspects.

In one embodiment, settings 470 may contain criteria with respect to previously received connection requests for whether forwarding a new connection request would cause excessive network congestion. Traffic control module 102 may be configured to use settings 470 in view of information from call record database 362 to determine whether or not to forward the new connection request. Settings 470 may contain any suitable criteria for evaluating whether forwarding a new connection request would cause excessive network congestion. Such criteria may be determined by experimental evaluation of behavior typical of autodialer behavior, or of connections or connection requests tending to cause unnecessary congestion of a network because of high overhead costs with little actual telephony traffic.

Settings 470 may include criteria specifying a certain number or percentage of short-duration connections or determined errors. Above such criteria, excessive network congestion may result. Such short-duration connections may include connections existing for less than a threshold duration, which may be considered to be, for example, a call wherein the recipient quickly hung-up a call reaching voice-mail. Determined errors may include errors reported by a recipient or service provider, or errors determined by traffic control module 102. The errors determined by traffic control module 102 may include, for example, a connection request that would violate a policy of a service provider, or would be directed towards an invalid or inactive phone number. A large number of short-duration or error-generating calls may be indicative of receiving or generating automatic phone calls. For example, an autodialer phone bank using a particular OCN may sequentially dial each number within a given destination OCN, greatly increasing the number of hang-ups of calls and errors for recipients within the destination OCN. The specified number or percentage of short-duration connections or determined errors may be applied to any suitable entity. For example, settings 470 may include a threshold of short-duration connections or determined errors to be applied to any combination of a destination and source phone number, OCN, or exchange. In another example, settings 470 may include a threshold of short-duration connections or determined errors to be applied at a single destination or source phone number, OCN, or exchange. A determined percentage of error or short-duration results may be determined on a designated, specified, or default time period.

Settings 470 may include criteria specifying an absolute amount of traffic or an increase in traffic. Above such criteria, excessive network congestion may result. Such traffic may indicate a high number of calls or texts, which may be indicative of receiving or generating automatic phone calls. In one embodiment, the criteria may include a threshold amount of traffic or an increase in traffic regarding a single portion of a network. For example, an autodialer may sequentially dial each number within a given destination exchange, greatly increasing the number of calls within the exchange. Settings 470 may include a threshold for the number of calls or for an increase in the number of calls within the exchange or a threshold for a percentage increase in the number of calls within the exchange. If such calls originate from senders associated with, for example, a given network device with an OCN, settings 470 may include a thresholds for the originating OCN. In another embodiment, Settings 470 may include criteria for evaluating an absolute or percentage amount of traffic between any given two entities within a network. For example, an autodialer phone bank associated with an OCN may be sequentially dialing recipients associated with a destination OCN. Settings 470 may include a threshold for a percentage of calls involving the same two OCNs. The traffic may be measured in settings 470, for example, in number of connections or connection requests, a number of CPS for a designated time period, or an increase in percentage of CPS for a designated time period.

The specified amount of traffic or increase in traffic may be applied to any suitable entity. For example, settings 470 may include a threshold of connections-per-second ("CPS") or a percentage increase in CPS to be applied to a destination or source phone number, OCN, or exchange.

Settings 470 may include criteria for evaluating a particular connection or connection request. In one embodiment, such criteria may include a characterization of a short-duration call in the form of a hang-up by a recipient. In another embodiment, such criteria may include a call that reaches voicemail and immediately terminates. Connections or connection requests so categorized may be used by other criteria in settings 470 to evaluate telephony traffic. In yet another embodiment, settings 470 may include criteria using a result from a particular test that has been applied to a connection request. For example, settings 470 may include criteria using the result of a test conducted by traffic control module 102 to determine whether a connection request is directed towards an invalid number or a device that is unavailable or not registered. In still yet another embodiment, settings 470 may include criteria specifying behavior indicative of a given entity that indicates the entity is engaging in autodialing. For example, settings 470 may include a threshold of a maximum number of sequential numbers that may be addressed by connection requests from a given entity such as an OCN. Settings 470 may include information for indicating that the connection request should be allowed if a connection request is not found to violate any thresholds indicating network congestion.

Settings 470 may include information about where to send a report or a log if a given congestion indicator is detected. Such information may contain an invoice. For example, settings 470 may include an indication that a given service provider should be notified or invoiced if network congestion is determined or if a connection request is blocked.

Settings 470 may include actions to be conducted as a result of specified criteria that are met. Traffic control module 102 may be configured to implement the action. Any suitable action may be included. In one embodiment, settings 470 may designate that a connection request should be denied. In a further embodiment, settings 470 may designate that connection requests should continue to be denied at a specified rate. Such a designation may cause traffic control module 102 to throttle the connection request, allowing some connection requests and denying the remainder connection requests at the specified rate. In another embodiment, settings 470 may designate that a particular action—such as denying or throttling—be taken for a specified period of time. In yet another embodiment, settings 470 may designate particular elements to which the action will be applied. For example, sources of connection requests identified by phone number, exchange, or OCN, destinations of connection requests identified by phone number, exchange, or OCN may be identified by settings 470. In still yet another embodiment, settings 470 may designate that the connection request and subsequent traffic are to be redirected through an alternative route to the recipients. Such an alternative route may, for example, be configured to handle traffic with lower priority, may provide less guaranteed network availability, may transfer traffic in less than real-time, and may be less expensive in terms of cost or resources. In an additional embodiment, settings 470 may designate that one or more tests are to be employed by traffic control module 102 on a present or additional connection request. Such tests may be expensive in terms of performance or resources. Consequently, such tests may be enabled upon other indicators that network congestion may occur. Any suitable test may be used, such as other elements of settings 470, determining whether a connection request is directed to a recipient on a do-not-call list, determining whether a connection request is for invalid number, or determining whether a connection request is directed to a recipient that is not available or not registered. In various embodiments, a particular action may be taken for a designated period of time. For example, connection requests from a given network entity may be throttled by a specified percentage for a set period of time.

Traffic control module 102 may be configured to access settings 470 to determine suitable action to take upon a received connection request. Traffic control module 102 may be configured may use settings 470 to evaluate the received connection request in light of information from call record database 362 to make such a determination. Using actions described, for example, in FIGS. 1-3, traffic control module 102 may be configured to determine information regarding the received connection request. Such actions may include evaluating the request, looking up information about the request in, for example, LERG database 364, or evaluating a reply from a recipient. The actions may yield information such as a source telephone number, OCN, or exchange, or a destination number, OCN, or exchange. Traffic control module 102 may use this information to access information regarding past connection requests and traffic from call record database 362. Traffic control module 102 may apply settings 470 to the connection and traffic information to determine whether forwarding the connection request to the intended recipient would cause unnecessary network congestion. If the rules, thresholds, or criteria in settings 470 are met by such a comparison, traffic control module 102 may apply an action specified by settings 470. Such actions may include denying or throttling requests from a given sender or network component to a given recipient or network component for a specified time or at a specified rate, redirecting connection requests and subsequent traffic on to an alternative path or route to the recipient, or applying additional tests on the connection request.

In operation, traffic control module 102 may receive a connection request. Traffic control module 102 may determine information about the request by examining the request, accessing sources of data such as LERG database 364, or examining a reply to the connection request. Traffic control module 102 may determine information such as a source number, source OCN, source exchange, destination number, destination OCN, or destination exchange.

Traffic control module 102 may access settings 470 to determine rules, criteria, or thresholds to apply to the received connection request. Such an application may be made in view of information in call record database 362.

For example, settings 470 may include a setting 471 with criteria that the results of connections or connection requests between any two given OCNs may not exceed a threshold percentage of errors short-duration connections or errors. Such such-duration connections may include, for example, connections classified as hang-up calls or calls reaching voicemail before terminating. The threshold percentage may be ten percent. Thus, if ten percent or more of the connections or requests sent from a particular source network device with a given OCN and targeting a particular destination network device with another given OCN result in short-duration connections or errors, then the criteria of setting 471 may be met. Setting 471 may include an action indicating that if the criteria are met, traffic control module 102 should throttle a specified network device, such as the source OCN, by a specified percentage, such as fifty percent. Using the actions specified in setting 471, traffic control module 102 may forward 50% of the subsequent connection requests between the two OCNs to the recipient, and may send error messages to the originator in response to the other 50%. The error messages may include spoofed reply messages, such as sending a progress message—indicating, for example, that the recipient's phone is ringing, waiting a period of time, and sending a subsequent message that there was no response.

Settings 470 may include a setting 472 with a criteria that the results of outbound connections or connection requests of a given source number may not exceed a threshold percentage of errors short-duration connections or errors. The threshold percentage may be ten percent. Thus, if ten percent or more of the connections or requests sent from a particular phone number result in short-duration connections or errors, then the criteria of setting 472 may be met. Setting 472 may include an action indicating that if the criteria are met, traffic control module 102 should redirect subsequent traffic originating from the number to a different network. Using the actions specified in setting 472, traffic control module 102 may forward subsequent connection requests over, for example, Network2, which may be configured to provide slower or cheaper transmission services that the service provider designated by the request.

Settings 470 may include a setting 473 with criteria that the traffic at a given destination exchange or network device may not exceed a threshold of CPS, such as twenty CPS at the "Seaside" exchange. In another example, setting 473 may indicate a maximum spike in CPS at the destination exchange or network device. Excessive CPS at a particular destination exchange or network device may be the result of autodialing targeting multiple recipients connected to the same destination exchange or network device. Thus, if the "Seaside" exchange experiences greater than twenty CPS, then the criteria of setting 473 may be met. Setting 473 may include an action indicating that if the criteria are met, traffic control module 102 should throttle connection requests from a determined or specified network device, such as the source OCN responsible for most of the connection requests contributing to the CPS of the destination exchange. Traffic control module 102 may examine the information in call record database 362 to determine from what network devices connection requests are coming. For example, traffic control module 102 may throttle 50% of the connection requests from the OCN identified as the source of the most subsequent connection requests to the destination exchange "Seaside."

Settings 470 may include a setting 474 with criteria that connections with a duration of less than a given threshold are to be considered by traffic control module 102 to be connections wherein a recipient has hung-up. Settings 470 may include a setting 475 with criteria that connections with a duration of less than a given threshold are to be considered by traffic control module 102 to be connections wherein voice-mail was reached at a recipient before the originator terminated the connection. Traffic control module 102 may record the status of connections falling within criteria 474 or criteria 475 in call record database 362. Traffic control module 102 may use such designations to determine, for example, quantities of short-duration connections to determine network congestion.

Settings 470 may include a setting 476 with a criteria that the number of outbound connections or attempts from a given source network device may not increase more than a threshold percentage within a designated time, if the resulting CPS is greater than a threshold amount. Such a spoke of outbound connection may indicate a phone bank of originators conducting autodialer operations. The threshold percentage may be one hundred percent, and the threshold amount of CPS may be twenty. Thus, if a given network device generates an increase of one hundred percent of connections or connection requests with at least twenty CPS, then the criteria of setting 476 may be met. Setting 476 may include an action indicating that if the criteria are met, traffic control module 102 should throttle the network device in question by a specified percentage, such as seventy-five percent.

Settings 470 may include a setting 478 with criteria of where to send a given report, invoice, or other record of an action taken to reduce network congestion. The identified destination may be a service provider identified as "Service1." The criteria may be tied to a particular one of settings 470, actions taken by traffic control module, or a combination thereof. Setting 478 may specify a time interval in which the report, invoice, or record is to be sent. Traffic control module 102 may forward a report, invoice, or other record based as specified in setting 478.

Settings 470 may include a setting 479 with criteria that the traffic between a source and destination network devices may not exceed a threshold percentage of total traffic for the destination network device. The threshold percentage may be ten percent. Such a condition may indicate a phone bank autodialer attempting to connect to multiple recipients connected to the OCN. Thus, if ten percent or more of the traffic for a given destination OCN is from a single source OCN, then the criteria of setting 479 may be met. Setting 479 may include an action indicating that if the criteria are met, additional tests, checks, or validations are to be made. Such additional tests, checks, or validations may be made on the connection request being evaluated by traffic control module 102, or upon subsequent connection requests. Such additional tests, checks, or validations may include an automatic number identification ("ANI") test validating the identity of an originator or a DNC test validating that the recipient is not on a DNC list. Such checks may be expensive in terms of required resources, and thus may be more efficiently deployed when other indications of network congestion are detected.

Settings 470 may include a setting 480 with criteria that a given originator or source network device may not sequentially dial or contact a threshold amount of sequentially numbered destination recipients. Such sequential contact may indicate that the originator or source network device is engaged in autodialing. The threshold amount of sequentially numbered destination recipients that may be contacted may be ten. The sequential aspect may be flexible to account, for example, for sequential dialing from lowest to highest, highest to lowest, or for sequential ordering by various quantities, such as every other number. Thus, if ten or more sequentially ordered destination numbers are contacted by a given originator or source network device, then the criteria of setting 480 may be met. Setting 480 may include an action indicating that if the criteria are met, traffic control module 102 should throttle the given originator or source network device by, for example, one hundred percent for one minute.

Traffic control module 102 may conduct one or more actions in response to one or more criteria of settings 470 being met. Such actions may include denying a connection request and subsequent similar connection requests, rerouting a connection request, forwarding the connection request to a recipient, reporting actions to a service provider, or conducting additional tests or checks. Traffic control module 102 may deny the connection request by issuing an error with an associated description, or by spoofing a reply or error by indicating to the originator that the connection request is being processed, waiting for a time period, and sending an indication that no reply has been received.

Figure 5:
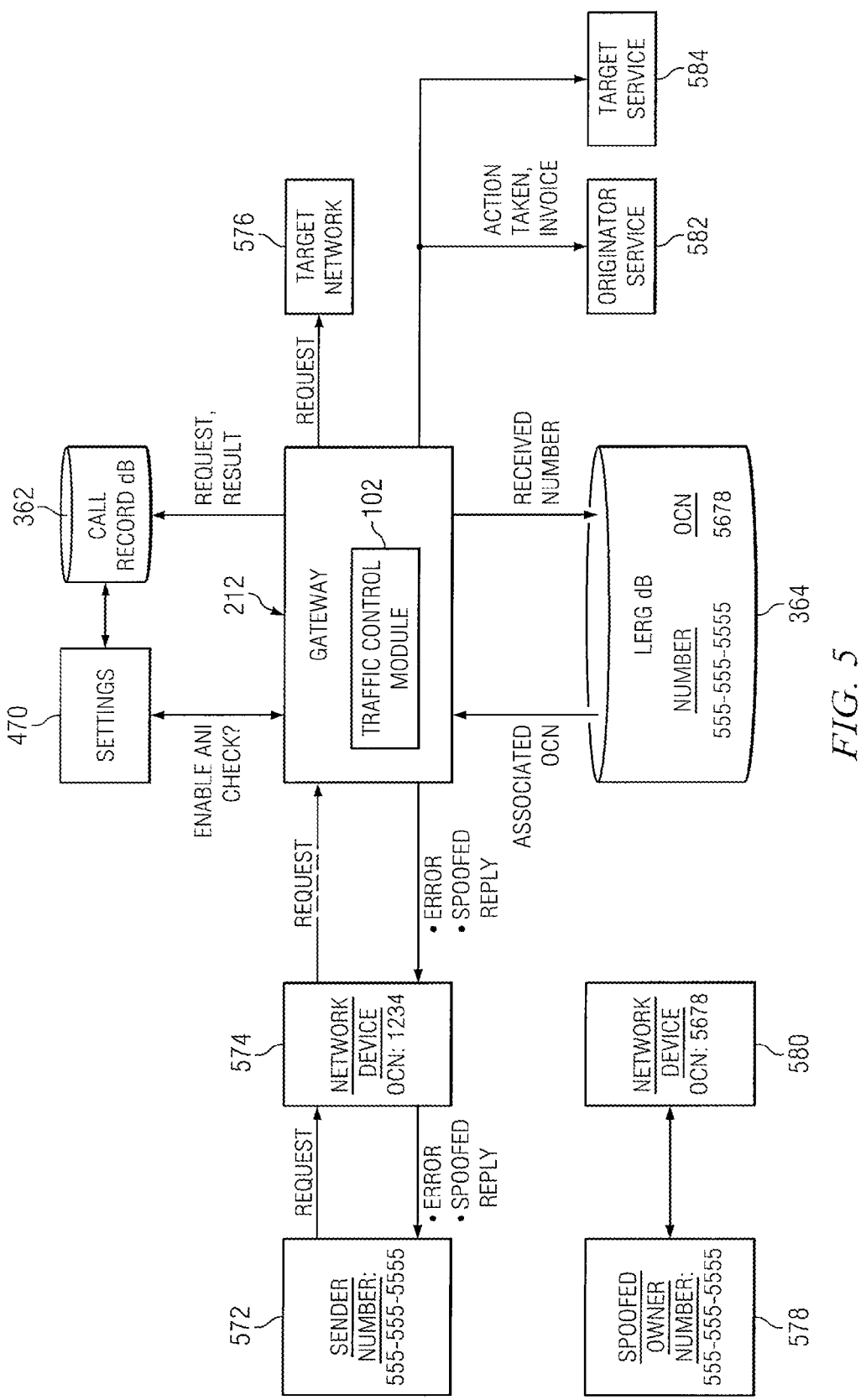
FIG. 5 is a more detailed illustration of example embodiments of the system configured to determine whether a connection request includes a spoofed identify of an originator of the connection request.

FIG. 5 is a more detailed illustration of example embodiments of system 100 configured to determine whether a connection request includes a spoofed identify of an originator of the connection request. Traffic control module 102 may be configured to make such a determination as part of an anti-spoofing or ANI test.

Sender 572 may be communicatively coupled to network device 574, which may be communicatively coupled to gateway 212 and/or traffic control module 102. Sender 572 may be configured to send connection requests through network device 574, which may be configured to send them to gateway 212 and/or traffic control module 102. Traffic control module 102 may be communicatively coupled to target network 576, and may be configured to forward the connection requests to target 576. Traffic control module 102 may be configured to send a reply, error, or spoofed reply to network device 574 or sender 572. Sender 572 may implement fully or in part one or more of originators 104, caller 218 and/or texter 222 of FIGS. 1-2. Network device 574 may implement fully or in part one or more originating telephony service 106, voice service 220, and/or text service 224 of FIGS. 1-3. Target network 576 may implement fully or in part one or more of recipients 108, PSTN recipient 226, wireless recipient 230, target telephony service 110, PSTN service 228, and/or wireless service 232 of FIGS. 1-3.

Traffic control module 102 may be configured to access settings 470 to determine whether or not to conduct examinations of received connection requests for spoofed identities. Such a spoofed identity may include an attempt by sender 572 to disguise its identity in the connection requests that it sends. Consequently, a recipient receiving such a connection request may perceive a false caller identification. Spoofed identities within connection requests may indicate autodialing, phishing scams, or other undesirable telephony traffic.

Sender 572 may be identified by a number, such as a telephone number. The number of sender 572 may be spoofed, wherein the number does not actually belong to sender 572. The spoofed number may belong to another entity, such as spoofed owner 578, or may belong to no owner at all. Network device 574 communicatively coupled to sender 572 may identified by an OCN number. Spoofed owner 578 may be communicatively coupled to another network device, such as network device 580, which may also be identified by an OCN number.

Traffic control module 102 may be communicatively coupled to any database, database cache, or any suitable source of information to determine whether a number associated with a presented communication request has been spoofed, counterfeited, or is otherwise false. Such an information source may include a database wherein information associated with a given number may be determined, and subsequently compared with other information presented by the connection request. Such an information source may include billing information for a given originator. Any suitable source of information for performing an ANI test may be used. Such a source of information may otherwise be used for billing purposes for a given phone number, such as charging the number for rendered telephony services. In one embodiment, such an information source may include a LERG database 364, or a cache thereof.

In one embodiment, traffic control module 102 may be configured to access LERG database 364 to determine whether or not an account exists that is associated with the number presented by sender 572 in the connection request. If the access of the database returns, for example, a null value, then traffic control module 102 may be configured to determine that the connection request has failed the check of billing information. Such a failure may indicate an attempt by the originator to present a spoofed number by the originator. LERG database 364 or traffic control module 102 may provide an interface to interpret a null or failed result from a source of data such as an underlying ANI or LERG database. Such a database may not be configured for a direct query for checking the validity of a phone number within its contents. Consequently, LERG database 364 or traffic control module 102 may be configured to interpret particular errors or responses to a query in order to determine that the number was not found.

In another embodiment, traffic control module 102 may be configured to access LERG database 364 to determine information included with a billing record associated with a presented number of the connection request. Any suitable information may be used. For example, if the billing record includes an identification of an associated OCN of a network device, the OCN from the billing record may be retrieved. Traffic control module 102 may be configured to compare the information from the billing record with information presented in the connection request. For example, the OCN retrieved from the billing record may be compared against an OCN determined from the connection request. If the information does not match, then traffic control module 102 may be configured to determine that the connection request has failed the check of billing information, which may indicate an attempt by the originator to present a spoofed number.

If traffic control module 102 determines that the connection request includes an attempt to present a spoofed number, traffic control module 102 may be configured to determine that the attempt fails an anti-spoofing test. Traffic control module 102 may be configured to perform any suitable subsequent action, such as sending an error or spoofed reply or error to sender 572 and network device 574. Traffic control module 102 may be configured to determine such actions by accessing settings 470. Traffic control module 102 may be configured to forward a connection request that has passed anti-spoofing tests to target network 576.

In operation, sender 572 may send a connection request through network device 574, which may arrive at gateway 212 and be viewed by traffic control module 102. The connection request may be intended for a particular entity in target network 576. Sender 572 may include an indication in the connection request that its number is, for example, 555-555-5555. Network device 574 may include an identifier such as an OCN value of "1234." At the same time, another entity such as spoofed owner 578 may exist with the number "555-555-5555," and be communicatively coupled to network device 580, which may include an identifier such as an OCN value of "5678."

Traffic control module 102 may access settings 470 to determine whether an anti-spoofing test is to be conducted on the received connection request. Traffic control module 102 may apply criteria in settings 470 in view of data in call record database 362 to make the determination.

Traffic control module 102 may conduct an anti-spoofing test upon the received connection request. In one embodiment, traffic control module 102 may access one or more sources of information to look up known characteristics associated with, for example, the originating number presented in the connection request. Such sources of information may include billing information. In particular, traffic control module 102 may look up the originating number presented by the connection request, 555-555-5555, in LERG database 364.

Traffic control module 102 may receive information associated with the number in response. Such information may include information stored with billing data, such the OCN identified with the number. For example, LERG database 364 may include information that the number 555-555-5555 is associated with network devices identified by the OCN "5678," according to billing records. Traffic control module 102 may compare the received information against information presented in the connection request. For example, the OCN identified by the billing record, "5678," may not match the OCN associated with the connection request, "1234." Such a discrepancy may cause traffic control module 102 to determine that the connection request has a spoofed number. Thus the connection request may fail the anti-spoofing test.

In another embodiment, traffic control module 102 may access one or more sources of information to determine whether the originating number is known. Such sources of information may include billing information. In particular, traffic control module 102 may look up the originating number presented by the connection request, 555-555-5555, in LERG database 364. Assuming that 555-555-5555 was not designated to spoofed owner 578 as shown in FIG. 3, but instead was not assigned to any such entity, traffic control module 102 may receive an indication that the number was not found in LERG database 364. Such an indication may include a null or error response from an underlying ANI database that may be interpreted by LERG database 364 or traffic control module 102 to mean that the number is not listed in the database. Consequently, if the number 555-555-5555 was not present within LERG database 364 or its underlying database, traffic control module 102 may determine that the connection request has a spoofed number. Thus the connection request may fail the anti-spoofing test.

If the connection request fails an anti-spoofing test performed by traffic control module 102, then traffic control module 102 may take any suitable action such as sending a spoofed reply or an error to sender 572 and network device 574. Traffic control module 102 may determine such actions by accessing settings 470. Traffic control module 102 may forward a connection request that has passed anti-spoofing tests to target network 576.

Figure 6:
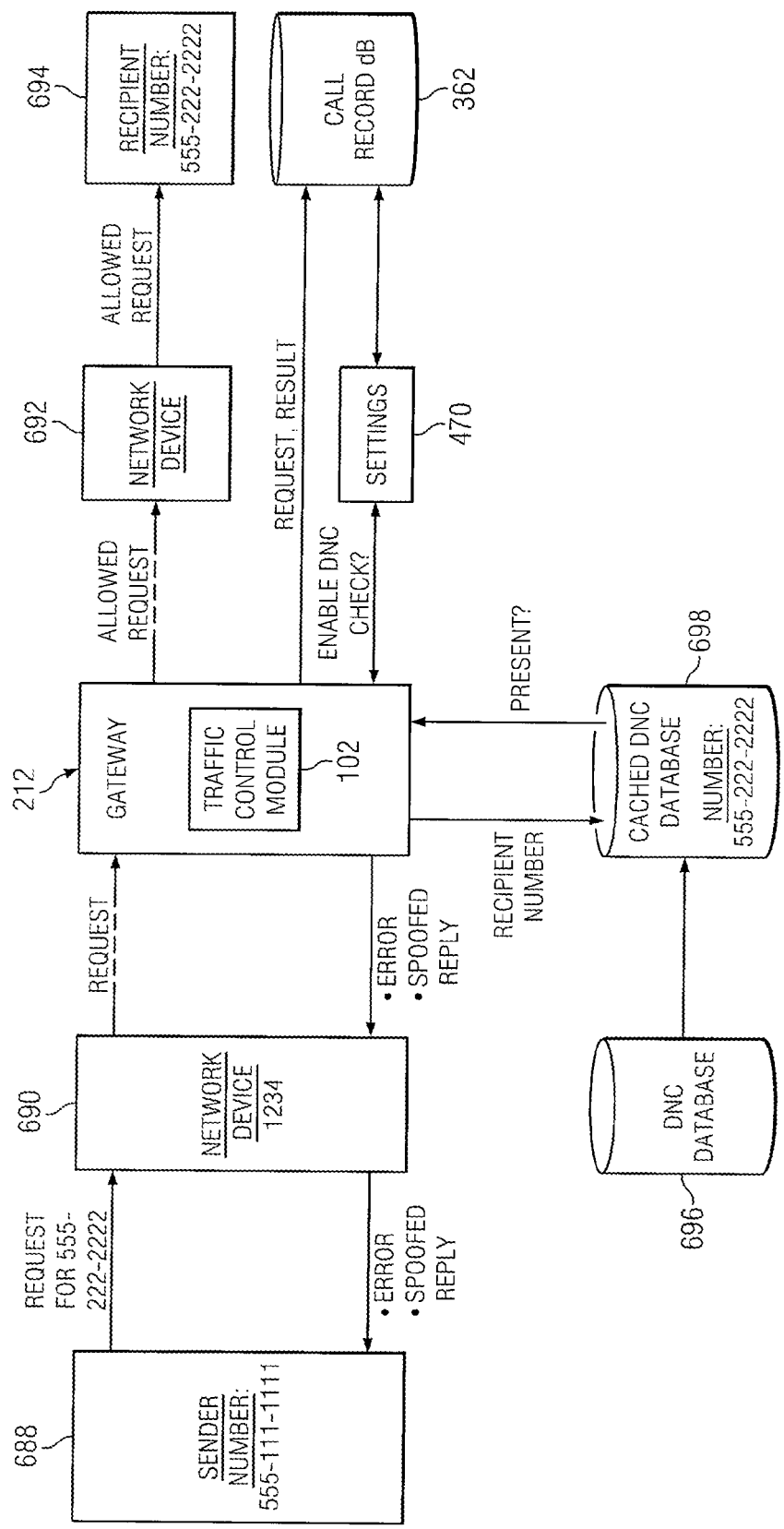
FIG. 6 is a more detailed illustration of example embodiments of the system configured to determine whether a connection request targets a recipient identified on a DNC list.

FIG. 6 is a more detailed illustration of example embodiments of system 100 configured to determine whether a connection request targets a recipient identified on a DNC list. A DNC list may include a list of recipients that are not to be contacted by certain kinds of originators or for certain kinds of communication. For example, a DNC list may include recipients who are not to be contacted by telemarketers. In another example, a service provider may issue a DNC list to traffic control module 102 to filter connection requests if indications of an autodialer are detected. Some DNC lists may be maintained by governmental authorities. DNC lists may be used by originators to determine what recipients should or should not be called. However, DNC lists may vary by place, jurisdiction, or service. Governmental DNC lists may not fully encompass all recipients who wish not to receive calls of a given type. A service provider may have particular requirements or desired DNC requests. DNC lists may not be accessible or available in real-time to telephony providers, as their use may be intended for originators to use to scrub call lists to prevent calls to recipients on the lists from being created at all. In addition, originators that are scammers or negligent may not follow or observe DNC lists.

Sender 688 may be communicatively coupled to network device 690, which may be communicatively coupled to gateway 212 and/or traffic control module 102. Sender 688 may be configured to send connection requests through network device 690, which may be configured to send them to gateway 212 and/or traffic control module 102. Traffic control module 102 may be communicatively coupled to network device 692, which may be communicatively coupled to recipient 694. Traffic control module 102 may be configured to block the connection request, or to forward the connection requests to network device 692, which may forward the connection requests to recipient 694. Traffic control module 102 may be configured to send a reply, error, or spoofed reply to network device 690 or sender 688. Sender 688 may implement fully or in part one or more of originators 104, caller 218, and/or texter 222 of FIGS. 1-2. Network device 690 may implement fully or in part one or more of originating telephony service 106, voice service 220, and/or text service 224 of FIGS. 1-2. Network device 692 may implement fully or in part one or more of target telephony service 110, PSTN service 228, and/or wireless service 232 of FIGS. 1-2. Recipient 694 may implement one or more of recipients 108, PSTN recipient 226, and/or wireless recipient 230 of FIGS. 1-2.

Traffic control module 102 may be configured to access settings 470 to determine whether or not to conduct a DNC test or check. Such a DNC test may be made against indications of entities—such as a DNC list—as defined by a service for which traffic control module 102 is reducing network congestion. In one embodiment, the DNC list may be established by a governmental authority. In another embodiment, the DNC list may be customized by the service for which traffic control module 102 is reducing network congestion.

Settings 470 may indicate that the DNC check is to be conducted upon, for example, all connection requests from a given originator, originating service provider, exchange, or network device. In such a case, the entity may have been determined to be an autodialer. In one embodiment, such a determination may be made by, for example, a setting or indication from a service provider causing such autodialing. In such an embodiment, the service provider may utilize traffic control module 102 to filter its outbound connection requests. Further, the traffic control module 102 may be configured to filter the outbound connection requests from designated entity for additional criteria, such as only allowing outbound connections to be sent to valid, active numbers or to recipients of a certain type (such as landline, mobile, or fax). In another embodiment, such a determination that an entity is responsible for autodialing may be made by, for example, criteria in settings 470 regarding a threshold of traffic resulting in errors or short-duration calls.

Traffic control module 102 may be communicatively coupled to any database, database cache, or any suitable source of information to determine recipient numbers which are not to be contacted with connection requests. Such an information source may include a database containing a DNC list. In one embodiment, such an information source may include cached DNC database 698, which may be a cache of DNC database 696. DNC database 696 may be unavailable in real-time, or not configured for queries as required by traffic control module 102.

Sender 688 and recipient 694 may be identified by a number, such as a telephone number. Network device 690 and network device 692 may be identified by, for example, an OCN. The number of recipient 694 may be contained within cached DNC database 698. Traffic control module 102 may be configured to access cached DNC database 698 to determine whether or not cached DNC database 698 references the number of recipient 694. If the access of the database returns, for example, a null value, then traffic control module 102 may be configured to determine that the number to which the connection request is made is not on the specified DNC list. Traffic control module 102 may provide an interface to interpret a null or failed result from a source of data such as cached DNC database 698. Such a database may not be configured for a direct query for checking the validity of a phone number within its contents. Consequently, traffic control module 102 may be configured to interpret particular errors or responses to a query in order to determine that the number was not found. However, if such a number is determined to be within cached DNC database 698, traffic control module 102 may be configured to determine that the attempted connection includes an attempt to contact a number on the specified DNC list.

If traffic control module 102 determines that the connection request includes an attempt to access a recipient within cached DNC database 698, traffic control module may be configured to determine that the connection request fails a DNC test. Traffic control module 102 may be configured to perform any suitable subsequent action, such as sending an error or spoofed reply or error to sender 688 and network device 690. Traffic control module 102 may be configured to determine such actions by accessing settings 470. Traffic control module 102 may be configured to forward a connection request that has passed the DNC test to network device 692 or recipient 694.

In operation, traffic control module 102 may access settings 470 to determine whether to conduct a DNC test on received connection requests. Settings 470 may designate that a DNC test be applied to connection requests originating from particular source entities or sent to particular destination entities. In one example, the designation may be made by settings received from a service provider indicating that all connection requests to or from the service provider should be evaluated using a DNC test. In another example, the designation may be determined from other criteria in settings 470, such as thresholds for autodialing determinations.

Sender 688 may be identified by a number such as 555-555-5555. Recipient 694 may be identified by a number such as 555-555-2222. Network device 690 may be identified by an OCN of "1234." Network device 692 may be identified by an OCN of "5678."

Thus, for example, settings 470 may indicate that connection requests from sender 688 identified by 555-555-5555, network device 690 identified by "1234," or a service provider including sender 688 or network device 690 may be evaluated using a DNC test. In another example, settings 470 may indicate that requests sent to recipient 694 identified by 555-555-2222, network device 692 identified by "5678," or a service provider including recipient 694 or network device 692 may be evaluated using a DNC test.

If settings 470 so indicate, traffic control module 102 may conduct a DNC test on received connection requests. Sender 688 may send a connection request through network device 690, which may arrive at gateway 212 and be viewed by traffic control module 102. The connection request may be intended for a particular entity such as recipient 694 by designating the number 555-555-2222.

Traffic control module 102 may conduct a DNC test upon the received connection request. Traffic control module 102 may access one or more sources of information to look up the number of the recipient, 555-555-2222, to determine whether the number is within a DNC list. For example, traffic control module 102 may access cached DNC database 698. Traffic control module 102 may receive information associated with the number in response. If the number is present within cached DNC database 698, then traffic control module 102 may determine that the connection request has failed the DNC test. For example, a request for 555-555-2222 may yield an entry in cached DNC database 698 and traffic control module 102 may determine that sender 688 has failed the DNC test. If traffic control module 102 receives a null or error response from cached DNC database 698, traffic control module 102 may determine that the connection request passes the DNC test. For example, a request for 555-555-1111 may yield a null, error, or empty response from cached DNC database and traffic control module 102 may determine that the connection request from sender 688 passes the DNC test. If the connection request fails a DNC test performed by traffic control module 102, then traffic control module 102 may take any suitable action such as sending a spoofed reply or an error to sender 688. For example, traffic control module 102 may send messages to sender 688 indicating that the recipient is being contacted and, after a delay, send messages indicating that there was no response. Traffic control module 102 may determine such actions by accessing settings 470. Traffic control module 102 may record the action and invoice a service provider for which the network congestion reduction is provided. Traffic control module 102 may forward a connection request that has passed the DNC test to recipient 694.

Figure 7:
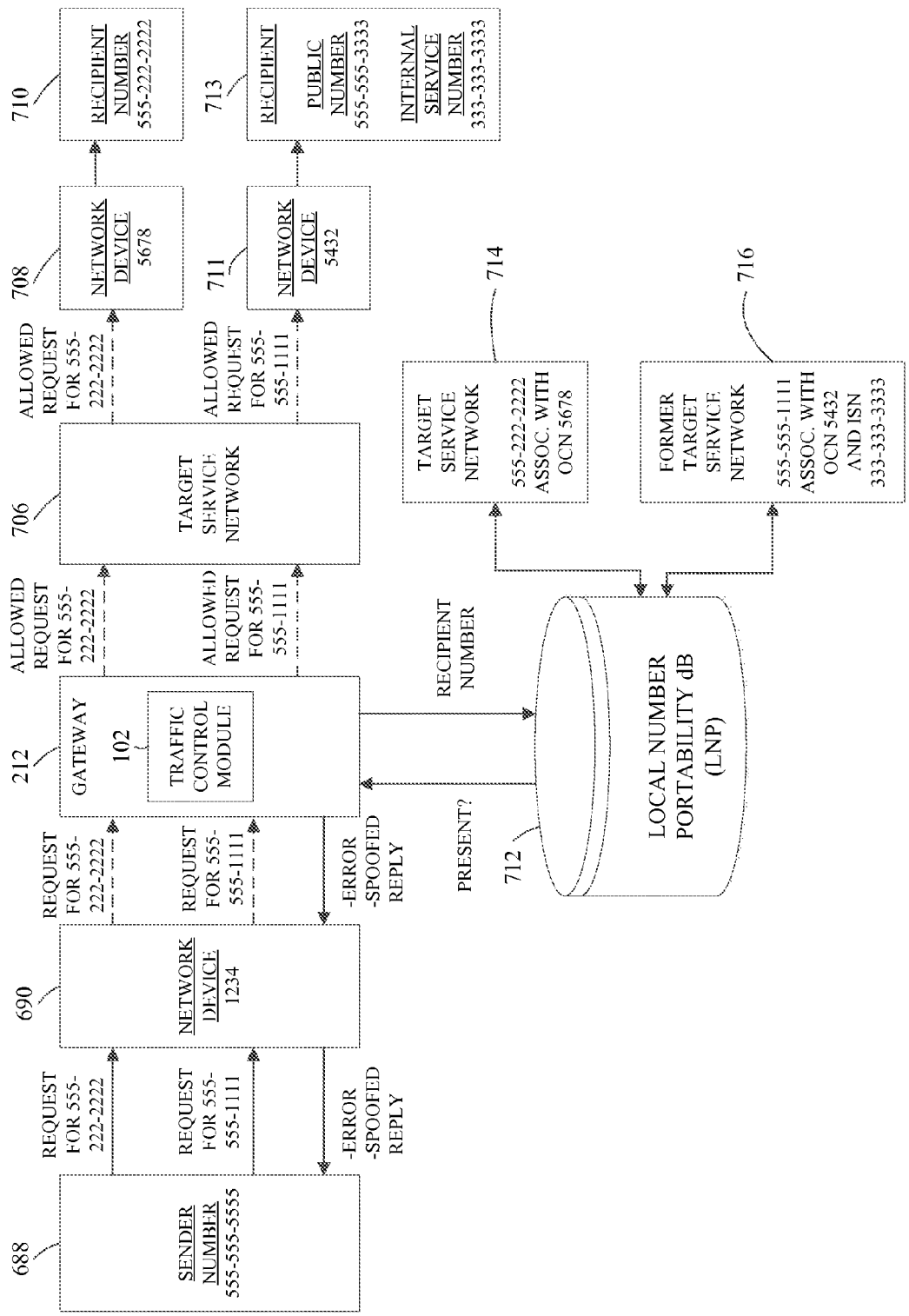
FIG. 7 is a more detailed illustration of example embodiments of the system configured to determine local number portability for an attempted connection request.

FIG. 7 is a more detailed illustration of example embodiments of system 100 configured to determine local number portability for an attempted connection request. Determining local number portability may be used to find correct routing information for a target recipient. The target recipient may have, for example, a number that has been ported between service providers, or may have a number must be translated into a local lookup number based on where the recipient has registered. System 100 may be configured to determine local number portability through any suitable mechanism. The result of determining local number portability may be correct routing information, such as identification of network devices through which a connection request must be sent. Such a result may be used to conduct analysis as shown in, for example, FIG. 1-6 or 8.

Sender 688 may be communicatively coupled to network device 690, which may be communicatively coupled to gateway 212 and/or traffic control module 102. Sender 688 may be configured to send connection requests through network device 690, which may be configured to send them to gateway 212 and/or traffic control module 102. Traffic control module 102 may be communicatively coupled to target service network 706. Target service network 706 may include, for example, network device 708 communicatively coupled to recipient 710 and network device 711 communicatively coupled to recipient 713. Traffic control module 102 may be configured to send connection requests to target service network 706, and more specifically, to entities within target service network 706 such as recipient 710 or recipient 713 through network device 708 or network device 711.

Sender 688 may implement fully or in part one or more of originators 104, caller 218 and/or texter 222 of FIGS. 1-2. Recipient 710 or recipient 713 may implement recipients 108, PSTN recipient 226, and/or wireless recipient 230 of FIGS. 1-2. Network device 708 or network device 711 may fully or in part implement target telephony service 110, PSTN service 228, and/or wireless service 232 of FIGS. 1-2.

In order to determine whether or how to forward connection requests to entities within service network 706, traffic control module 102 may be configured to access routing information for the connection request from any suitable source. Traffic control module 102 may be configured to access such sources to determine whether, for example, to what network devices a recipient is attached. Such information may be used to determine network congestion. A received connection request configured to be sent to a recipient identified by a number may not be accessible by that number. To determine where the recipient may actually be accessed, traffic control module 102 may be configured to look up various sources of information.

For example, traffic control module 102 may be configured to look up the recipient of a connection request in a database with routing information for a given recipient, such as local number portability ("LNP") database 712. LNP database 712 may include information from a variety of sources to provide routing information based on a recipient phone number. LNP database 712 may be implemented by, for example, a database, record, file, data structure, or other suitable mechanism. Traffic control module 102 include, for example, routing information for a given phone number. Traffic control module 102 may be configured to query LNP database 712 for the phone number and receive route information in return. In one embodiment, such route information may include the OCN of a network device to which the recipient is connected, such as the OCN for network device 708 which is communicatively coupled to recipient 710. The OCN may be used to determine factors affecting network congestion as described herein. Traffic control module 102 may be configured to store the retrieved route information in call record database 362 for further use. In one embodiment, the access of LNP database 712 may be accomplished as part of an all-call-query, wherein a centralized database is checked for such routing information.

In another example, traffic control module 102 may be configured access LNP database 712 for a number of a recipient. LNP database 712 may be configured to return the identity of a service provider that, according to LNP database 712, is a provider of service for the recipient. Traffic control module 102 may access a service provider for the recipient based on such information from LNP database 712 or through other sources of information. In one embodiment, the access of LNP database 712 or through other sources of information may be accomplished as part of a query-on-release, wherein a last known service provider for the recipient is consulted.

Thus, traffic control module may be configured to access a target service provider to determine routing information for a given recipient of a connection request. In one example, traffic control module 102 may be configured to access target service 714. Target service 714 may include routing information associated with the recipient, and may be configured to provide such routing information to traffic control module 102.

In another example, traffic control module 102 may be configured to access former target service 716. Former target service 716 may include a service provider which previously was used by the recipient. Former target service 716 may include information regarding the present service provider, such as target service 714. Thus, former target service 716 may be configured to redirect the request from traffic control module 102 to the target service 714, which may have current information regarding routing for the recipient. Target service 714 may provide the route to traffic control module 102, or may provide the route to former target service 716, which may in turn provide the route to traffic control module 102. Target service 714 and former target service 716 may thus use onward routing or call dropback routing to provide routing information to traffic control module.

In yet another example, traffic control module 102 may be configured to access a source of information—such as LNP database 712—to determine whether the recipient is addressed by a internal service number particular to telephony equipment that to which the recipient is registered. Such an example may occur with mobile devices, wherein the generally known number of the mobile device used by other telephony devices is translated into a internal service number specific to the mobile telephony service or equipment associated with the mobile device. Recipient 713, with public number 555-555-1111, may be addressable within target service network 706 by internal service number 333-333-3333. Traffic control module 102 may be configured to access LNP database to determine the routing information associated with the internal service number. Traffic control module 102 may be configured to translate and lookup such information in order to determine routing information, which may be used to conduct network congestion analysis as described herein.

In one embodiment, the resulting route information may include the OCN of a network device to which the recipient is connected, such as the OCN for network device 708 which is communicatively coupled to recipient 710 or for network device 711 which is communicatively coupled to recipient 713. The OCN may be used to determine factors affecting network congestion as described herein. Traffic control module 102 may be configured to store the retrieved route information in call record database 362 for further use.

The sources of information accessed by traffic control module 102 may include sources typically used for downstream routing in real-time. Traffic control module 102 may access such sources of information to obtain routing information for performing congestion analysis.

In operation, traffic control module 102 may receive a connection request from sender 688. Traffic control module 102 may access one or more sources of information to determine routing information for one or more recipients of the connection request.

Sender 688 may be identified by a number such as 555-555-5555. Network device 690 may be identified by a number such as "1234." Network device 708 may be identified by a number such as "5678." Recipient 710 may be identified by a number such as 512-222-2222. Network device 711 may be identified by a number such as "5432." Recipient 713 may be identified by a public number such as 555-555-3333, and by an internal service number of 333-333-3333.

Sender 688 may send out a connection request for 555-222-2222, attempting to reach recipient 710. Sender 688 may send out a connection request for 555-555-1111, attempting to reach recipient 713.

In one embodiment, traffic control module 102 may determine routing information for the connection request targeting recipient 710 by, for example, accessing LNP database 712 by using the number 555-222-2222. LNP database 712 may indicate that the number 555-222-2222 is associated with routing information including OCN "5678." Traffic control module 102 may use the determined OCN to analyze network congestion. In another embodiment, traffic control module 102 may access target service 714. Target service 714 may have registered the number 555-222-2222 as associated with routing information including OCN "5678." In yet another embodiment, traffic control module 102 may access former target service 716. Former target service 716 may have previously registered the number. Former target service 716 may include a link to the service to which the number was transferred, such as target service 714. Traffic control module 102 may use the link to access target service 714, or former target service 716 may retrieve the information on behalf of traffic control module 102. As described above, target service 714 may have registered the number 555-222-2222 as associated with routing information including OCN "5678." The resulting routing information may be retrieved by target service 714 returning the information to former target service 716, which may return the information to traffic control module 102, or by returning the information to traffic control module 102 directly.

In still yet another embodiment, traffic control module 102 may access LNP database to determine routing information for a connection request, wherein the connection request is routed to a recipient that has registered with a service provider using an internal service number. For example, traffic control module 102 may receive the request targeting recipient 713 using number 555-555-1111. Traffic control module 102 may access LNP database 712 to determine that 555-555-1111 has been registered using internal service number 333-333-3333. Traffic control module 102 may access a data source such as LNP database 712 to determine that 333-333-3333 in turn is associated with routing information including OCN "5432."

After receiving routing information, traffic control module 102 may store the routing information is call record database 362. Traffic control module 102 may use the routing information to conduct analysis of possible network congestion.

Figure 8:
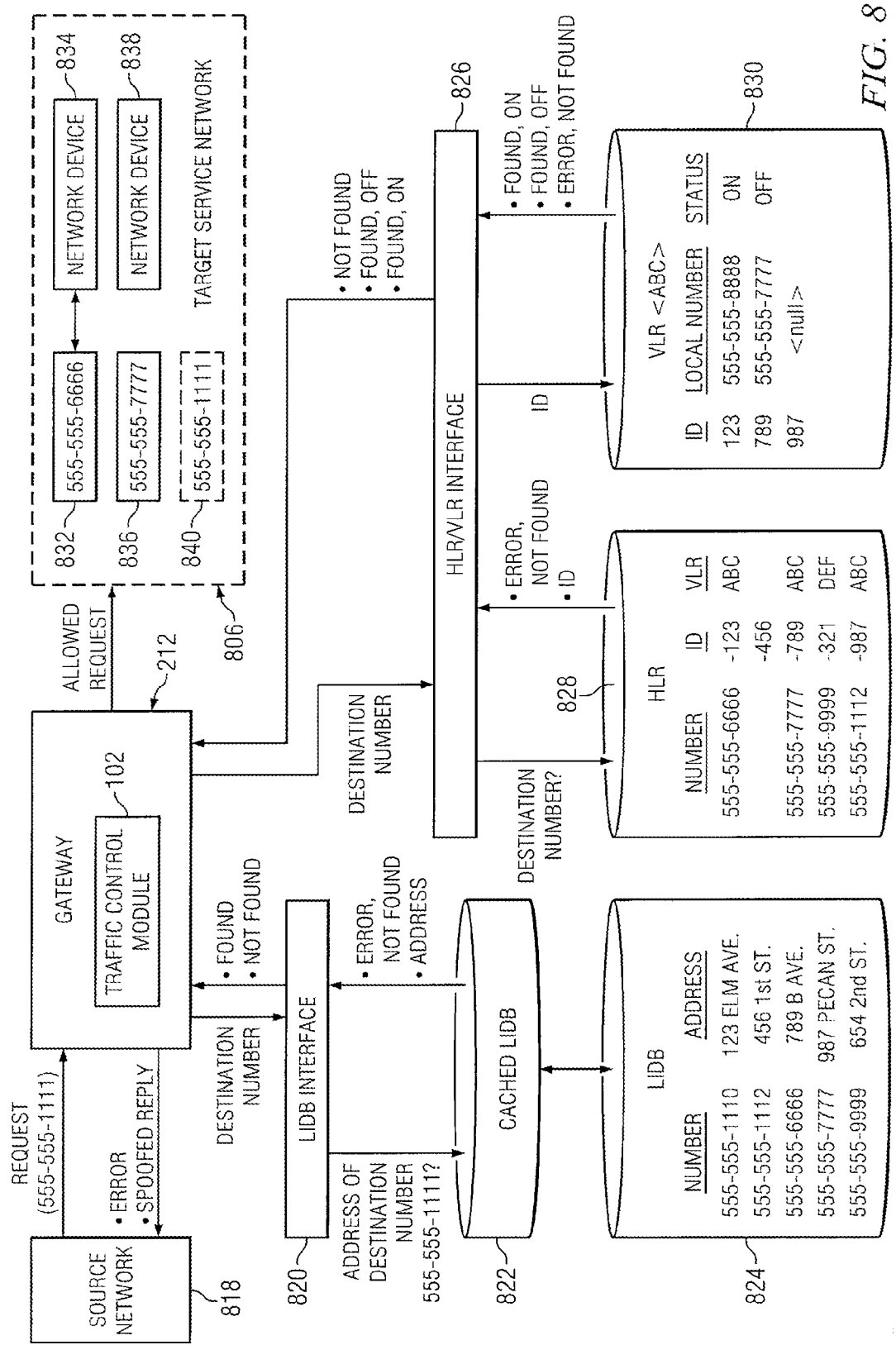
FIG. 8 is a more detailed illustration of example embodiments of the system configured to determine whether a connection request targets a recipient that may receive the connection request;'

FIG. 8 is a more detailed illustration of example embodiments of system 100 configured to determine whether a connection request targets a recipient that may receive the connection request. Some connection requests may be sent to recipients that are unable to receive connection requests. Some such requests may be made repeatedly by an autodialer.

Traffic control module 102 may be configured to determine whether a received connection request is likely to be received if the connection request is forwarded to the intended recipient. To make such a determination, traffic control module 102 may be configured to conduct any suitable analysis based on the connection request, or access any suitable entity for information associated with the connection request. In one embodiment, traffic control module 102 may be configured to determine whether an intended recipient of a connection request is valid. In another embodiment, traffic control module 102 may be configured to determine whether an intended recipient of a connection request is active or otherwise available to receive connection requests.

Source network 818 may be communicatively coupled to gateway 212 and/or traffic control module 102. Source network 818 may be configured to send connection requests to gateway 212 and/or traffic control module 102. Traffic control module 102 may be communicatively coupled to target service network 806. Target service network 806 may include one or more network devices and recipients, including network device 834 communicatively coupled to recipient 832, and network device 838 not presently communicatively coupled to recipient 836. Target service network 806 might not include recipient 840. Traffic control module 102 may be configured to block the connection request, or to forward the connection requests to various entities within target service network 806. Traffic control module 102 may be configured to send a reply, error, or spoofed reply to network devices or originators in source network 818. Source network 818 may implement fully or in part originators 104, caller 218, texter 222, originating telephony service 106, voice service 220, and/or text service 224 of FIGS. 1-2. Recipient 832, recipient 836, and recipient 840 may fully or in part implement recipients 108, PSTN recipient 226, and/or wireless recipient 230 of FIGS. 1-2. Target service network 806, network device 834, and network device 838 may fully or in part implement target telephony service 110, PSTN service 228, and/or wireless service 232 of FIGS. 1-2.

In order to evaluate received connection requests, traffic control module 102 may be communicatively coupled to any suitable source of information, such as databases or database caches. In one embodiment, traffic control module 102 may be communicatively coupled to a database or cache thereof that includes billing, caller identification, or address information. For example, traffic control module 102 may be communicatively coupled to a line information database ("LIDB") 824 or cache 822 thereof. In another example, traffic control module 102 may be communicatively coupled to the LERG database 364 of FIG. 5. LIDB 824 may include caller identification information and may typically be used by phone companies to provide caller identification information concerning originators to recipients. Such information may be unavailable in real-time to traffic control module 102, or operate within systems inaccessible to traffic control module. Cached LIDB 822 may include information cached periodically, on demand, or upon certain events from LIDB 824. In addition, LIDB 824 or cached LIDB 822 may not be configured for queries as required by traffic control module 102.

In one embodiment, traffic control module 102 may be configured to access sources of information such as LIDB 824 or cached LIDB 822 if the intended recipient of the connection request is identified as a recipient on a PSTN network. In another embodiment, traffic control module 102 may be configured to access such sources of information regardless of whether the intended recipient is identified as resident on a PSTN or a mobile network.

System 100 may include LIDB interface 820 communicatively coupled to traffic control module 102 and cached LIDB 822 or LIDB 824 to provide access via queries as required by traffic control module 102, the queries between traffic control module 102 and cached LIDB 822 or LIDB 824. In one embodiment, LIDB interface 820 may be included within traffic control module 102. LIDB interface 820 may be implemented by, for example, any suitable module, library, executable, application, script, function, or other entity. LIDB interface 820 may be configured to formulate queries from traffic control module 102 into formats understood by cached LIDB 822 or LIDB 824. For example, given a destination number from a connection request received at traffic control module 102, LIDB interface 820 may be configured to form a query to seek the address of the destination number. LIDB interface 820 may be configured to interpret results of queries received from cached LIDB 822 or LIDB 824. For example, if an address is returned, LIDB interface 820 may be configured to indicate to traffic control module 102 that the address is found and that the number is a valid number. In another example, if an address is not returned, LIDB interface 820 may be configured to indicate to traffic control module 102 that the address was not found and that the number is an invalid number. The result returned from LIDB 824 or cached LIDB 822 may be an error or a null value if an entry for the destination number was not found.

If the destination number is not found in sources of information such as cached LIDB 822 or LIDB 824, traffic control module 102 may be configured to determine that the destination number is not valid. In such a case, traffic control module 102 may be configured to send any suitable response to source network 818. For example, traffic control module 102 may be configured to send an error or spoofed reply to source network 818. The spoofed reply may include one or messages indicating that the connection request has been forwarded and that no reply has been received. Traffic control module 102 may be configured to store the invalid number result in a database such as call record database 362. Further, traffic control module 102 may be configured to not forward the connection request to the intended recipient in target service network 806.

If the destination number is found in sources of information such as cached LIDB 822 or LIDB 824, traffic control module 102 may be configured to determine that the destination number is valid. In one embodiment, traffic control module 102 may be configured to forward the connection request to the intended recipient in target service network 806. Further, traffic control module 102 may be configured to store the valid number result in a database such as call record database 362. In another embodiment, traffic control module 102 may be configured to determine whether the intended recipient is active or available before determining whether to forward the connection request.

Traffic control module 102 may be configured to access a source of information, such as cached LIDB 822, LIDB 824, or LERG database 364 of FIG. 3 to determine the nature of the intended recipient of the connection request. In one embodiment, if the type of the intended recipient is a mobile, pager, or other entity configured to roam between different network devices in target service network 806, traffic control module 102 may be configured to access one or more sources of information to determine whether the entity is active and registered with at least one such network device. Such an access may be made to determine whether a connection request may actually be received by the entity. In another embodiment, traffic control module 102 may be configured to make such access even if the intended recipient is not such a mobile, page, or other entity configured to roam between different network devices.

Traffic control module 102 may be configured to access any suitable source of information to determine whether the intended recipient of the connection request is active and available to receive the connection request. In one embodiment, traffic control module 102 may be configured to access information about roaming wireless devices to make such a determination. As a wireless device is transported, it may come into contact with a variety of wireless network transmitters, networks, and equipment. The wireless device may be shut on or off. As a wireless device enters the domain of a particular wireless network, device, transmitter, or other equipment, the wireless device may become associated with such an entity. The association may be made in order to correctly route telephony connections to the wireless device in its present location. The wireless device may thus become registered with only one such network entity at a time. Upon such a registration, connection information for the wireless device may be stored in an information source for the network entity in, for example, a visitor location register ("VLR") associated with the network entity. Information concerning to which network entity or VLR a given wireless device is registered may be kept in, for example, a home location register ("HLR"). In one embodiment, a given wireless device may be registered with one and only one VLR at a time. As a wireless device is moved from the domain of one network entity to another, the wireless device may be registered with the VLR of the new network entity and HLR may be updated to reflect the VLR in which the wireless device is registered. Consequently, traffic control module 102 may be configured to determine whether the wireless device is registered and active by determining to which network entity the wireless device is registered, if any, and by then determining through the network entity whether the wireless device is active.

Thus, for example, traffic control module 102 may be configured to access one or more visitor location registers ("VLR") 830 to determine whether an intended recipient is active and registered with a target network or equipment associated with the VLR 830. VLR 830 itself may include an identification of itself to distinguish between other VLRs. VLR 830 may contain indications of possible recipients and whether or not the recipient is active. A given possible recipient may be registered within VLR 830 with a local number used to route telephony traffic within the domain of VLR 830. Such a local number may or may not be equivalent to the number by which the recipient is normally addressed from outside the domain of VLR 830. If the number by which the recipient is normally addressed is not used to index entries in VLR 830, traffic control module 102 may be configured to use information from other sources such as HLR 828 to make queries of VLR 830. In various embodiments, cached versions of HLR 828 or VLR 830 may be accessed by traffic control module 102. Such cached versions may be accessed when access to the underlying databases is impractical or unavailable.

Furthermore, traffic control module 102 may be configured to access HLR 828 to determine which VLR to access for a given intended recipient, or to determine whether the intended recipient is valid. HLR 828 may include information for a given recipient number, such a number being the normal way that the recipient is contacted. The information may include an identifier. In one embodiment, a given recipient number may have multiple identifiers associated with it. The recipient may have multiple identifiers in cases where the recipient may be configured to receive multiple types of telephony traffic. In another embodiment, the identifier may be the same as the recipient number. In yet another embodiment, the identifier may include a Mobile Subscriber Integrated Services Digital Network Number ("MSISDN"). In still yet another embodiment, the identifier may include an International Mobile Subscriber Identity ("IMSI") number. The identifier may also be used to index entries in various VLRs such as VLR 830. HLR 828 may also include an identification of the VLR to which the recipient number is registered.

Thus, traffic control module 102 may be communicatively coupled to HLR 828 and/or VLR 830 to determine whether a given intended recipient is valid, registered, and active. In order to facilitate communication with HLR 828 or VLR 830, traffic control module 102 may be communicatively coupled to HLR/VLR interface 826. HLR/VLR interface 826 may be configured to provide access via queries as required by traffic control module 102 to HLR 828 or VLR 830. In one embodiment, HLR/VLR interface 826 may be included within traffic control module 102. HLR/VLR interface 826 may be implemented by, for example, any suitable module, library, executable, application, script, function, or other entity. HLR/VLR interface 826 may be configured to formulate queries from traffic control module 102 into formats understood by HLR 828 or VLR 830, and to interpret results of queries received from HLR 828 or VLR 830.

For example, given a destination number from a connection request received at traffic control module 102, HLR/VLR interface 826 may be configured to form a query to seek an identifier or a VLR of the destination number and to send the query to HLR 828. HLR/VLR interface 826 may be configured to interpret results of queries received from HLR 828. In one embodiment, if an identification is returned, HLR/VLR interface 826 may be configured to indicate to traffic control module 102 that the recipient is found and that the number is a valid number. In another embodiment, if an identification is returned, HLR/VLR interface 826 may conduct additional analysis before determining that the number is a valid number. If an address is not returned, LIDB interface 820 may be configured to indicate to traffic control module 102 that the address was not found and that the number is an invalid number. The result returned from HLR 828 may be an error or a null value if an entry for the destination number was not found.

Given an identifier returned or a VLR returned from HLR 828, HLR/VLR interface 826 may be configured to form a query to seek a status of the recipient and send the query to VLR 830. HLR/VLR interface 826 may be configured to determine which VLR to send the query based on the results returned from HLR 828. HLR/VLR interface 826 may be configured to interpret results of queries received from VLR 830. If no result is returned, LIDB interface 820 may be configured to indicate to traffic control module 102 that the identifier was not found and that the number is an invalid number. The result returned from HLR 828 may be an error or a null value if an entry for the identifier was not found.

In one embodiment, VLR 830 may include a status of whether a device associated with an identifier is switched on or off. The query formed by HLR/VLR interface 826 may include a query for such a status. Thus the query may result in the value of the status, indicating whether the device is switched on or off. HLR/VLR interface 826 may be configured to indicate to traffic control module 102 that the number was found and whether or not the device is on or off, based on such an indication from VLR 830.

In another embodiment, VLR 830 may include a null or empty value in, for example, the local number field if the device associated with the identifier is switched off. The query formed by HLR/VLR interface 826 may thus include a query for the local number. Such a query may result in, for example, the associated local number if the device is switched on. HLR/VLR interface 826 may be configured to interpret the receipt of the local number as an indication that the device is switched on. However, the same query to obtain the local number may result in an error or null value if the device is switched off. Thus, HLR/VLR interface 826 may be configured to interpret the receipt of such an error or null value of the local number as an indication that the device is switched off.

In yet another embodiment, if the device associated with the identifier is switched off, no associated entry for the device may be present within VLR 830. The query formed by HLR/VLR interface 826 may thus include a query for the identifier. Such a query may result in, for example, any information for the identifier if the device is switched on. If the device is switched off, the query for the identifier may return, for example, an error or null value. HLR/VLR interface 826 may be configured to interpret the receipt of any information fields as an indication that the device is switched on, and to interpret the receipt of an error or null value as an indication that the device is switched off.

HLR/VLR interface 826 may be configured to indicate to traffic control module whether the destination number was found in the combination of HLR 828 and VLR 830, and whether or not the device is active.

If the destination number is not found in sources of information such as HLR 828 and VLR 830, traffic control module 102 may be configured to determine that the destination number is not valid. Further, the destination number may have been determined to not be active or registered. In such cases, traffic control module 102 may be configured to send any suitable response to source network 818. For example, traffic control module 102 may be configured to send an error or spoofed reply to source network 818. The spoofed reply may include one or messages indicating that the connection request has been forwarded and that no reply has been received. However, the connection request may have not left traffic control module 102. Traffic control module 102 may be configured to store the invalid number in a database such as call record database 362. Further, traffic control module 102 may be configured to not forward the connection request to the intended recipient in target service network 806.

If the destination number is found in sources of information such as HLR 828 and VLR 830, and is determined by such sources to be associated with a registered and active device, traffic control module 102 may be configured to determine that the destination number is valid, active, and registered. In one embodiment, traffic control module 102 may be configured to forward the connection request to the intended recipient in target service network 806. Further, traffic control module 102 may be configured to store the result in a database such as call record database 362.

In operation, recipient 832 may be identified by the destination number 555-555-6666, the local number 555-555-8888, and may be active and registered with network device 834. Recipient 836 may be identified by the destination number 555-555-7777, but may be inactive and previously registered with network device 838. Recipient 840, identified by the destination number 555-555-1111 may not be a valid, actual recipient. Recipient 840 may have never existed, or may have existed previously but is disconnected or no longer a working destination number.

One or more originators in source network 818 may make connection requests of various possible recipients identified by destination numbers. Such destination numbers may include 555-555-1110, 555-555-1111, 555-555-1112, 555-555-6666, 555-555-7777, or 555-555-9999. The connection requests may be received or intercepted by traffic control module 102 or gateway 212 and subsequently handled by traffic control module 102.

Traffic control module 102 may evaluate, for a given connection request, whether a destination number is valid, and whether or not devices associated with the destination number are registered and active. Traffic control module 102 may make such evaluation through the use of LIDB interface 820 and HLR/VLR interface 826. If the destination number is valid, registered, and active, traffic control module 102 may forward the request to the intended recipient in target service network 806. If not, traffic control module 102 may send an error or a spoofed reply back to the originator in source network 818. Traffic control module 102 may store results of such an evaluation in a database such as call record database 362.

In one embodiment, traffic control module 102 may determine the validity or active status of the destination number by accessing information such as that contained in LIDB 824 if the request is made of a recipient on an PSTN. In another embodiment, traffic control module 102 may determine the validity or active status of the destination number by accessing information such as that contained in HLR 828 and VLR 830 if the request is made of a recipient in a wireless network.

LIDB interface 820 may access information about received requests in, for example, cached LIDB 822 or LIDB 824. LIDB interface 820 may formulate and send a query for the received information in such information sources. The query may include a query, for example, for address information associated with the destination number. LIDB interface 820 may interpret the results of such a query. If, for example, address information is returned as a result of the query, LIDB interface 820 may interpret such a result as indicating the number is valid. If, in another example, a null value or error is returned, LIDB interface 820 may interpret such as result as indicating that the number is not valid.

For example, traffic control module 102 may receive a request intended for a recipient identified by 555-555-1110. Traffic control module 102 may send information about the request to LIDB interface 820, which may formulate a query for the destination number in cached LIDB 822. The query in cached LIDB 822 may return an address of "123 Elm Ave." LIDB interface 820 may interpret the return of the address information as an indication that the destination number is in cached LIDB 822 or LIDB 824, and thus valid. LIDB interface 820 may notify traffic control module 102 that the number is valid in terms of LIDB information. In one embodiment, traffic control module 102 may determine that the destination number 555-555-1110 is valid, based on such information, and may forward the connection request for 555-555-1110 to target service network 806. In another embodiment, traffic control module 102 may further validate the connection request by, for example, determining whether a device associated with the destination number is registered and active.

In another example, traffic control module 102 may receive a request intended for a recipient identified by 555-555-1111. Traffic control module 102 may send information about the request to LIDB interface 820, which may formulate a query for the destination number in cached LIDB 822. The query in cached LIDB 822 may return no results, an error, or a null value because no entry for 555-555-1111 exists within cached LIDB 822 or LIDB 824. LIDB interface 820 may interpret the return of no results, an error, or a null value as an indication that the destination number is not within cached LIDB 822 or LIDB 824, and thus is not valid. LIDB interface 820 may notify traffic control module 102 that the number is not valid in terms of LIDB information. Traffic control module 102 may determine that the destination number 555-555-1110 is not valid, based on such information, and may not forward the connection request for 555-555-1110 to target service network 806. The result of the determination may be stored in call record database 562 as a failed attempt to reach the destination number. The connection request may never leave traffic control module 102 or gateway 212. In response to the connection request, traffic control module 102 may send an error message, a spoofed reply, or other suitable information to source network 818. The spoofed reply may indicate to the originator that, for example, the request was forwarded, that a certain amount of time passed, but no reply was received.

In one embodiment, access of HLR 828 or VLR 830 may be made after validity of a destination number is checked through access and verification of information in LIDB 824 or cached LIDB 822, as described above. In another embodiment, access of HLR 828 or VLR 830 may be made without such verification of LIDB 824 or cached LIDB 822. In such an embodiment, traffic control module 102 may have first determined that that the destination number is associated with a wireless device.

HLR/VLR interface 826 may access information about received connection requests in, for example, cached HLR 828 or VLR 830, to determine whether the intended recipients of the request are registered and active. HLR/VLR interface 826 may formulate and send a query for the received information in such information sources. The query may include a query, for example, for an identifier or other information associated with the destination number in HLR, which if successful may be used to the access entries in VLR 830. HLR/VLR interface 826 may interpret the results of such a query. If, for example, an identifier or other information is returned as a result of the query, HLR/VLR interface 826 may interpret such a result as indicating the destination number has been registered or is valid. If, in another example, a null value or error is returned, HLR/VLR interface 826 may interpret such as result as indicating that the number has not been registered or is not valid. HLR/VLR interface 826 may send the interpretation or the result to traffic control module 102.

If HLR/VLR interface 826 receives an identifier or other indication that the destination number is registered, HLR/VLR interface 826 may access a VLR identified by the results of the query. Such a VLR may include VLR 830. HLR/VLR interface 826 may formulate and send a query to VLR 830 to determine whether the device identified by the destination number is active. The query may be formulated using, for example, the identifier returned from HLR 828. In one embodiment, the query may be formulated to return a status indicated in VLR 830 of whether the device is active. In another embodiment, the query may be formulated to return information, such as local number, in VLR 830 associated with the identifier. The existence of such information may indicate that the status of the associated device is active, while non-existence of such information—indicated by, for example, a returned null value for local number—may be interpreted to indicate that the associated device is inactive. In yet another embodiment, the query may be formulated to return any information of VLR 830 associated with the identifier. A returned value of such information may be interpreted to indicate that the status of the associated device is active, while no returned results, a null value, or an error may be interpreted to indicate that the status of the associated device is not active.

HLR/VLR interface 826 may interpret the results of such a query. If, for example, an active status, a local number, or other information is returned as a result of the query, HLR/VLR interface 826 may interpret such a result as indicating that the device associated with destination number is active. If, in another example, a null value or error is returned, HLR/VLR interface 826 may interpret such as result as indicating that the device associated with the destination number is not active. HLR/VLR interface 826 may send the interpretation or the result to traffic control module 102.

For example, traffic control module 102 may receive a request intended for a recipient 832 identified by 555-555-6666. In one embodiment, traffic control module 102 may have previously determined through, for example, LIDB interface 820 that such a destination number is valid. In another embodiment, traffic control module 102 may have not attempted to previously determine whether such a destination number is valid. Traffic control module 102 may send information about the request to HLR/VLR interface 826, which may formulate a query for the destination number in HLR 828. The query of HLR 828 may return two identifiers, "123" and "456", in VLR "ABC." One such identifier may correspond to voice service for a device with the destination number. The other identifier may correspond to another service for the device. HLR/VLR interface 826 may interpret the return of the identifier as an indication that the destination number is registered in HLR 828, and thus valid. HLR/VLR interface 826 may notify traffic control module 102 that the number is valid in terms of HLR information. Traffic control module 102 may determine that the destination number 555-555-6666 is valid, based on such information. HLR/VLR interface 826 may identify the VLR "ABC" associated with the identifiers as VLR 830. Thus, HLR/VLR interface 826 may formulate a query for the identifier "123" in VLR 830. In one embodiment, the query of VLR 830 may be for a status indication associated with identifier "123." In such an embodiment, the query may return a status of "ON." The local number returned, being associated with the destination number 555-555-6666, may be 555-555-8888. Traffic control module 102 may determine that the device associated with destination number 555-555-6666 is active, based on such information, and may forward the connection request for 555-555-6666 to target service network 806. In fact, recipient 852 associated with destination number 555-555-6666 may be active and communicatively coupled to network device 834. The result of the determination may be stored in call record database 562 as a successful attempt to reach the destination number.

A query of HLR 828 yielding more than one identifier, such as "123" and "456" in the above example, may result in HLR/VLR interface 826 formulating a query for each identifier in VLR 830. In one embodiment, as long as one such identifier is determined to be active, the device associated with the identifiers may be determined to be active.

In another example, traffic control module 102 may receive a request intended for recipient 836 identified by 555-555-7777. In one embodiment, traffic control module 102 may have previously determined through, for example, LIDB interface 820 that such a destination number is valid. In another embodiment, traffic control module 102 may have not attempted to previously determine whether such a destination number is valid. Traffic control module 102 may send information about the request to HLR/VLR interface 826, which may formulate a query for the destination number in HLR 828. The query of HLR 828 may return an identifier "789" in VLR "ABC." HLR/VLR interface 826 may interpret the return of the identifier as an indication that the destination number is registered in HLR 828, and thus valid. HLR/VLR interface 826 may notify traffic control module 102 that the number is valid in terms of HLR information. Traffic control module 102 may determine that the destination number 555-555-7777 is valid, based on such information. HLR/VLR interface 826 may identify the VLR "ABC" associated with the identifiers as VLR 830. Thus, HLR/VLR interface 826 may formulate a query for the identifier "789" in VLR 830. In one embodiment, the query of VLR 830 may be for a status indication associated with identifier "789." In such an embodiment, the query may return a status of "OFF." Traffic control module 102 may determine that the device associated with destination number 555-555-7777 is not active, based on the return of a status of "OFF", and may not forward the connection request for 555-555-7777 to target service network 806. In fact, the recipient 836 may be inactive, and thus not communicatively coupled to network device 838. The result of the determination may be stored in call record database 562 as a failed attempt to reach the destination number. The connection request may never leave traffic control module 102 or gateway 212. In response to the connection request, traffic control module 102 may send an error message, a spoofed reply, or other suitable information to source network 818. The spoofed reply may indicate to the originator that, for example, the request was forwarded, that a certain amount of time passed, but no reply was received.

In yet another example, traffic control module 102 may receive a request intended for recipient identified by 555-555-1112. In one embodiment, traffic control module 102 may have previously determined through, for example, LIDB interface 820, that such a destination number is valid. In another embodiment, traffic control module 102 may have not attempted to previously determine whether such a destination number is valid. Traffic control module 102 may send information about the request to HLR/VLR interface 826, which may formulate a query for the destination number in HLR 828. The query of HLR 828 may return an identifier "987" in VLR "ABC." HLR/VLR interface 826 may interpret the return of the identifier as an indication that the destination number is registered in HLR 828, and thus valid. HLR/VLR interface 826 may notify traffic control module 102 that the number is valid in terms of HLR information. Traffic control module 102 may determine that the destination number 555-555-1112 is valid, based on such information. HLR/VLR interface 826 may identify the VLR "ABC" associated with the identifiers as VLR 830. Thus, HLR/VLR interface 826 may formulate a query for the identifier "987" in VLR 830. In one embodiment, the query of VLR 830 may be for whether VLR 830 contains any local number information associated with identifier "987." In such an embodiment, the query may return a null value, no result, or error. Traffic control module 102 may determine that the device associated with destination number 555-555-1112 is not active, based on the return of such information, and may not forward the connection request for 555-555-1112 to target service network 806. The result of the determination may be stored in call record database 562 as a failed attempt to reach the destination number. The connection request may never leave traffic control module 102 or gateway 212. In response to the connection request, traffic control module 102 may send an error message, a spoofed reply, or other suitable information to source network 818. The spoofed reply may indicate to the originator that, for example, the request was forwarded, that a certain amount of time passed, but no reply was received.

In still yet another example, traffic control module 102 may receive a request intended for recipient 850 identified by 555-555-1111. In one embodiment, traffic control module 102 may have previously determined through, for example, LIDB interface 820, that such a destination number is invalid. In another embodiment, traffic control module 102 may have not attempted to previously determine whether such a destination number is valid. Traffic control module 102 may send information about the request to HLR/VLR interface 826, which may formulate a query for the destination number in HLR 828. The query of HLR 828 may fail to return a resulting identifier from HLR 828. HLR/VLR interface 826 may interpret the failure to return an identifier as an indication that the destination number is not registered in HLR 828, and thus invalid. HLR/VLR interface 826 may notify traffic control module 102 that the number is was not found in HLR 828. Traffic control module 102 may determine that the destination number 555-555-1111 is invalid, based on such information. However, if HLR/VLR interface 826 does find an entry for 555-555-1111 in HLR 828, HLR/VLR interface 826 formulate a query for the associated identifier in VLR 830. If the query returns a null value, no result, or error, HLR/VLR interface 826 may indicate such a result to traffic control module 102. Traffic control module 102 may determine that the destination number is not active or is invalid, based on the return of such information, and may not forward the connection request for 555-555-1111 to target service network 806. The result of the determination may be stored in call record database 562 as a failed attempt to reach the destination number. The connection request may never leave traffic control module 102 or gateway 212. In response to the connection request, traffic control module 102 may send an error message, a spoofed reply, or other suitable information to source network 818. The spoofed reply may indicate to the originator that, for example, the request was forwarded, that a certain amount of time passed, but no reply was received.

In one embodiment, traffic control module 102 may determine whether a connection request from an originator 104 is configured to target an appropriate type of recipient 108. For example, a connection request may be for voice traffic but may target a fax recipient. In another example, a connection request may be for fax traffic but may target a wireless recipient. In yet another example, a connection request may be an SMS message but may target a PSTN or wireless recipient unable to handle the request. Such mismatched telephony types may be the result an autodialer targeting multiple phone lines. In such a case, the autodialer may be making calls to sequentially numbered lines or may be targeting a list of recipients with out-of-date information.

Traffic control module 102 may examine the connection request to determine the telephony type. Traffic control module 102 may access any suitable source of information to determine a type of recipient, such as LERG database 364 or LIDB 824. Querying a destination number of a recipient 108 targeted by the connection request may result in, for example, an indication that recipient 108 is a fax, PSTN, wireless, or other type of recipient or device. Traffic control module 102 may compare the telephony type of the connection request and the determined type of recipient 108. If the types are mismatched such that recipient 108 would be unable to successfully handle the connection request, traffic control module 102 may determine that the connection request is invalid. Traffic control module 102 may send an error or spoofed reply to originator 104 if the connection request is invalid, without forwarding the connection request to recipient 108. If the device type of recipient 108 is configured to properly receive the connection request, traffic control module may determine that the connection request is valid. In such a case, traffic control module 102 may forward the connection request to recipient. Further, traffic control module 102 may record the connection attempt in call record database 362. If the connection request was invalid, traffic control module 102 may record the attempt as an error.

In one embodiment, system 100 may determine whether a list of destination numbers, each potentially associated with a recipient 108, is valid or not. The list of destination numbers may be provided by, for example, a service provider such as voice provider 234 or text provider 236, or an entity operating telemarketing or activities involving large numbers of outbound calls. The list may be provided to system 100 in order to remove numbers from the list that, for example, are on a DNC list, do not correspond to a valid or registered recipient 108, or do not correspond to an intended type of recipient. The list of destination numbers may be thus scrubbed to avoid generating connection requests for recipients 108 which could not or should not receive such connection requests.

For each element in the list, traffic control module 102 may examine the destination number. Traffic control module 102 may determine whether the destination number is contained, for example, within cached DNC database 698 or DNC database 696. If so, then traffic control module 102 may remove the destination number from the list. Further, traffic control module 102 may determine whether the destination number is within LIDB 824, or HLR 828 and VLR 830. If so, then traffic control module 102 may remove the destination number from the list. In addition, traffic control module may determine the nature of the device associated with recipient 108. If, for example, the device is not a landline or wireless device, then traffic control module 102 may remove the destination number from the list.

After the elements of the list have been examined and invalid or unwanted elements removed, the scrubbed list may be provided to the service provider or entity requesting it. The recipients 108 in the list may then be called.

Figure 9:
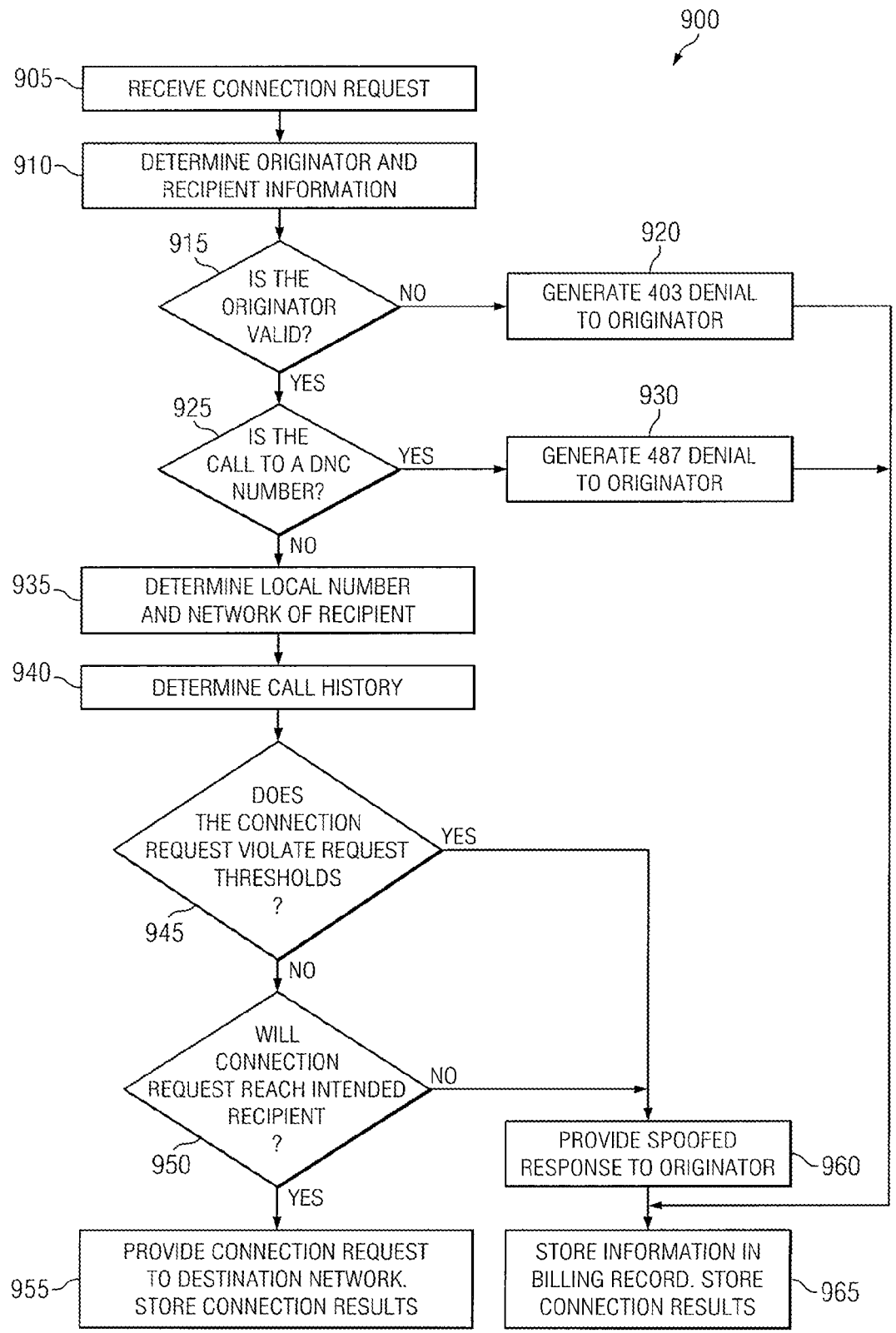
FIG. 9 is an illustration of an example embodiment of a method 900 for reducing network congestion.

FIG. 9 is an illustration of an example embodiment of a method 900 for reducing network congestion. Method 900 may be conducted on behalf of, for example, a service provider to reduce network congestion delivered from within an originating telephony network. In another example, method 900 may be conducted on behalf of a service provider to reduce network congestion in a destination telephony network.

In step 905, a telephony connection request may be received for an intended recipient. In step 910, originator and recipient information about the connection request may be determined. The telephony connection request may have originated from a telephony device through a source network, including particular intermediate network devices. The originating telephony device may be identified by, for example, a source number. The intermediate network devices in the source network may be identified by, for example, an OCN. The telephony connection request may be made for a recipient associated with, for example, an destination number and resident within a destination network. The destination network may include particular intermediate network devices. The intermediate network devices may be identified by, for example, an OCN.

In step 915, it may be determined whether the originator is valid. Any suitable method may be used to determine whether the originator is valid. In one embodiment, the information provided in the connection request may be compared against one or more sources of information to determine whether information about the alleged originator matches known information. Step 915 may be implemented, for example, fully or in part by method 1000 of FIG. 10. If the originator is not valid, then in step 920 any suitable response may be taken. The connection request may not be forwarded. An error or a spoofed reply may be sent to the originator. In one embodiment, an SIP code "403" denial may be generated and sent to the originator. Method 900 may then proceed to step 965.

If the originator is valid, then in step 925 it may be determined whether the connection request has been made to a destination number on a DNC list. in one embodiment, step 925 may be conducted on behalf of a service provider handling the origination of connection requests. In another embodiment, execution of step 925 may be enabled if indications of network congestion have been detected through previous call or connection history. Such network congestion indications may be based on the identities of one or more of the originator, source network elements, destination network elements, or recipients. The indications of network congestion may be determined through, for example, a certain number of failed connection requests exceeding a given threshold amount. Determining whether the connection request has been made to a destination number on a DNC list may be conducted in any suitable manner. For example, a cached version of a DNC may be accessed. Step 925 may be implemented fully or in part by method 11000 of FIG. 11.

If the connection request is determined to be made to a destination number on a DNC list, then in step 930 any suitable response may be taken. The connection request may not be forwarded. If the connection request has been received at a gateway or other telephony network equipment, the connection request may not leave the equipment. An error or a spoofed reply may be sent to the originator. In one embodiment, an SIP code "487" denial may be generated and sent to the originator. Method 900 may then proceed to step 965.

If the connection request is not determined to be made to a destination number on a DNC list, then in step 935, the local number or telephony network of the intended recipient may be determined. The local number or network may be determined in any suitable manner. In one example, a LERG database may be accessed to determine routing information for the network of the intended recipient. In another example, the intended recipient may have a destination number that has been ported from one service provider to another. In such a case, a central database for local number portability may be accessed to determine routing information for the number, or a former service provider may be accessed to determine a current service provider, which in turn may be accessed to determine routing information for the number. In yet another example, a recipient may be addressed within its service network by a local number such as an internal service number. The internal service number and associated routing information may be determined by looking up the internal service number in a database, such as an LNP database, and using the internal service number to determine routing information for the recipient. In still yet another example, routing information for a recipient may be determined by examining records of call and connection history.

In step 940, call or connection history may be determined. In one embodiment, a history database may be accessed to determine call or connection history. Information such as previous connections or attempted connections may be determined. Such information may include originating information, destination information, and resulting status. The originating information may include identification of the source of the connection or attempted connection, such as source number or source OCN. The destination information may include identification of the intended recipient of the connection or attempted connection, such as destination number or destination OCN. The resulting status may include information regarding the outcome of the connection or the connection request. The resulting status may include, for example, an indication of a successful connection, a duration of a connection, an error returned in response to an attempt, or the nature of the error.

In step 945, it may be determined whether the connection request, recent call history, or connection history, violates thresholds which may thus indicate network congestion. Exceeding such thresholds may be an indication of autodialers. Any suitable threshold may be used, such as number or percent of errors or unsuccessful traffic, calls per second, an increase in traffic, or destination numbers dialed in sequence. Such traffic may be defined in any suitable manner, such as traffic at a particular destination or portion of a destination network, between a particular destination and a particular source, between a particular portion of a destination network and a particular portion of a source network, or any combination thereof. Such thresholds may be stored in, for example, settings, a record, a file, a database, or any suitable entity. Step 945 may be implemented fully or in part by method 1200 of FIG. 12. If the connection request, recent call history, or recent connection history violates such thresholds, any suitable action may be taken. Such actions may be implemented fully or in part by method 1200 of FIG. 12. Examples of such action may include throttling subsequent traffic, including the received connection request. Throttling traffic may include not forwarding a certain percentage of received connection requests to the intended recipient or recipient network. The certain percentages may be established by settings, for example. Throttling traffic may be performed for a specified duration. Another example of such action may include enabling other tests or checks on received connections. Yet another example of such action may include rerouting the connection request through alternative networks rather than the intended destination network. In one embodiment, if the connection request, recent call history, or recent connection history violates thresholds, then method 900 may proceed to step 960.

If the connection request, recent call history, or recent connection history does not violate thresholds, or if the connection request is allowed despite throttling connection requests, in step 950 it may be determined whether the connection request would successfully reach the intended recipient. Any suitable test may be used to make such a determination. For example, the type of connection request may be compared against the type of recipient, the destination number may be checked to be determined whether it is valid, or it may be determined whether the recipient is registered and available to receive connection requests. Step 950 may be implemented fully or in part by method 1300 of FIG. 13.

If the connection request would not successfully reach the intended recipient, then method 900 may proceed to step 960. If the connection request would successfully reach the intended recipient, or if at least no tests of the connection request indicate otherwise, then in step 955 the connection request may be forwarded to the intended recipient. The connection request may be forwarded to the intended recipient through the designated destination network. The connection request and the subsequent results may be logged or stored. Such stored information may be used in subsequent execution of method 900 to, for example, make determinations such as those in step 945.

In step 960, it may have been determined that the connection request would not successfully reach the intended recipient or that congestion thresholds have been exceeded. In response to such a determination, any suitable action may be taken. The connection request may not be forwarded to the intended recipient or the target telephony network containing the intended recipient. By not forwarding the connection request, the target telephony network may not need to expend resources transporting the connection request to the intended recipient only to fail to successfully deliver the connection request. Further, congestion in the target telephony network may be reduced by not forwarding the connection request. In one embodiment, an error may be provided to the originator of the connection request. In another embodiment, a spoofed response may be provided to the originator of the connection request. The spoofed response may indicate that the connection request was sent to the intended recipient. Further, the spoofed response may indicate that the connection request is being processed, has resulted in ringing the intended recipient, that there was no answer, that intended recipient was unavailable, or that the connection request reached voicemail.

In step 965, the connection request and the subsequent results may be logged or stored. Such stored information may be used in subsequent execution of method 900 to, for example, make determinations such as those in step 945. Further, the information regarding the results, such as what tests determined that the connection request would not be forwarded, may be stored in billing records. Such billing records may be used to invoice or otherwise provide information to a service provider for whom method 900 is conducted. Such a service provider may include, for example, a destination service provider for whom method 900 is conducted to reduce congestions, or an originating service provider for whom method 900 is conducted to eliminate excessive originating calls.

Figure 10:
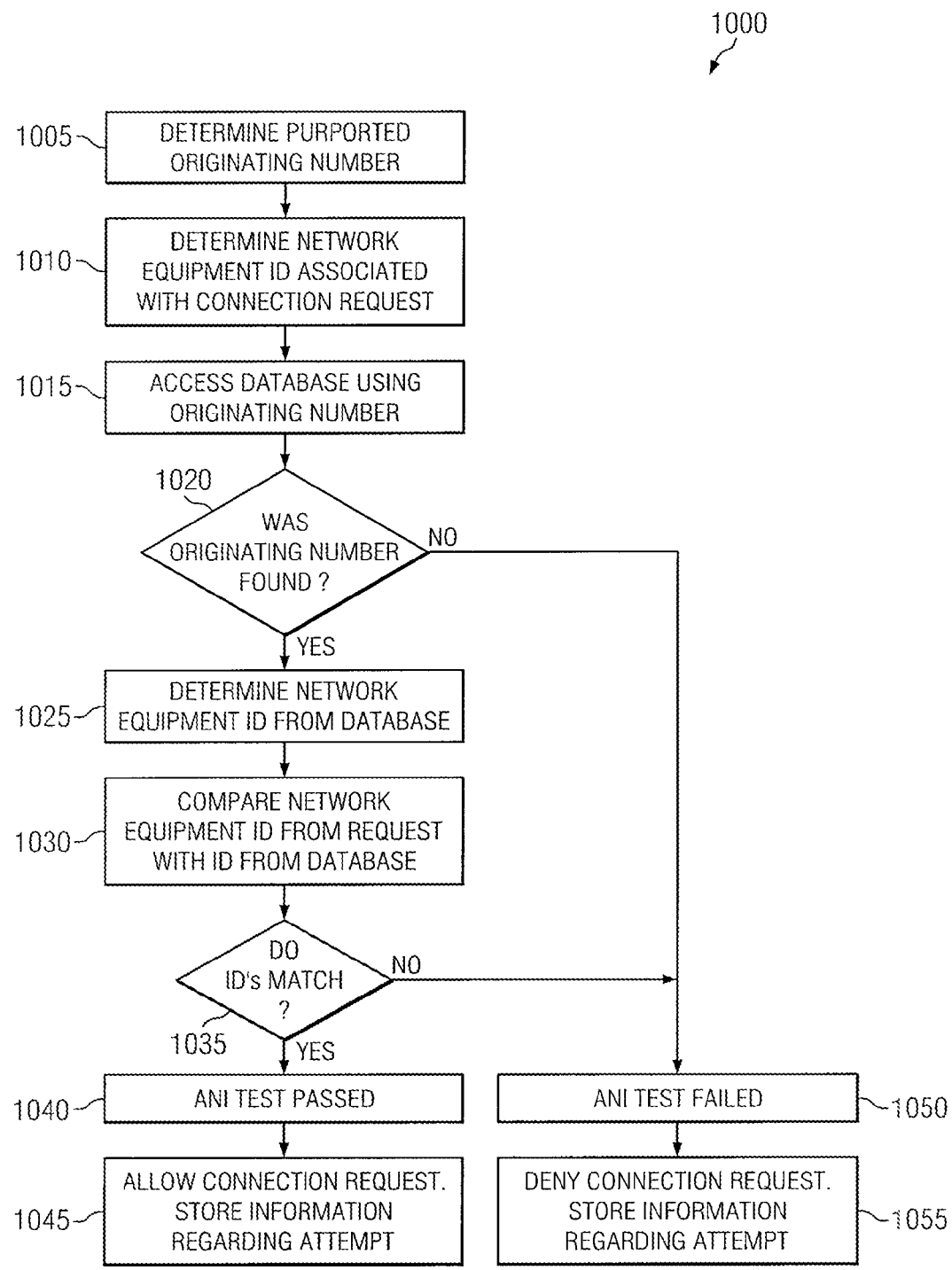
FIG. 10 is an illustration of an example embodiment of a method 1000 for determining whether or not an originator of a telephony connection request is valid.

FIG. 10 is an illustration of an example embodiment of a method 1000 for determining whether or not an originator of a telephony connection request is valid. Method 1000 may implement fully or in part step 915 of FIG. 9. Method 1000 may be conducted to determine, for example, whether the originator of the connection request is attempting to spoof any information regarding itself. Such an attempt to spoof information may be indicative that the originator is an autodialer. Method 1000 may implement fully or in part a verification of the automatic number identifier validity of the originator.

In step 1005, a phone number or similar identifier of the originator of the connection request may be determined Such a determination may be made by accepting the identification that the connection request purports is valid. In step 1010, information regarding telephony equipment used to send the connection request may be determined Such a determination may be made by accepting information provided by the connection request. The information may include, for example, routing information or identifiers of network equipment.

In step 1015, a database, database cache, or other source of information may be accessed using the phone number determined in step 1005. Any suitable source of information may be used. In one embodiment, a source of billing information may be used. In another embodiment, a LERG database may be used. In step 1020, it may be determined whether the phone number was found in the source of information. If not, then method 1000 may proceed to step 1050.

If the phone number was found in the source of information, then in step 1025 one or more identifiers of network equipment associated with the phone number may be accessed in the source of information. Such identifiers may indicate a portion of the routing information or other network equipment known to the source of information as associated with the phone number in question. The identifiers may include, for example, a local exchange or a device with a particular OCN. In step 1030, the identifier provided by the connection request and the identifier retrieved from the source of information may be compared. In step 1035, it may be determined whether the two identifiers match. A failure to match the identifiers may indicate that the connection request contains spoofed information. If the identifiers do not match then method 1000 may proceed to step 1050.

If the identifiers do match, then in step 1040 it may be determined that the connection request does not contain spoofed information and has passed the ANI test. In step 1045, the connection request may be allowed to be forwarded and information regarding the attempt may be stored. The information may be stored in a call record database which may be accessed to determine network congestion conditions.

If the identifiers do not match, or if the phone number was not found in the source of information, in step 1050 it may be determined that the connection request contains spoofed information and has failed the ANI test. The connection request may be denied. The information may be stored in a call record database, which may be accessed to determine network congestion conditions. Any suitable corrective action may be taken, such as sending an error or a spoofed reply to the originator. The spoofed reply may not accurately reflect the outcome of the attempt. The spoofed reply may implicitly or explicitly indicate that the connection request was forwarded. In one embodiment, an SIP code "403" denial may be generated and sent to the originator. The originator of the connection request may be determined to be an autodialer. Subsequent connection requests from the originator may be throttled, denied, or replied to with a spoofed response. Such connection requests may be denied without forwarding the connection request to the intended recipient.

Figure 11:
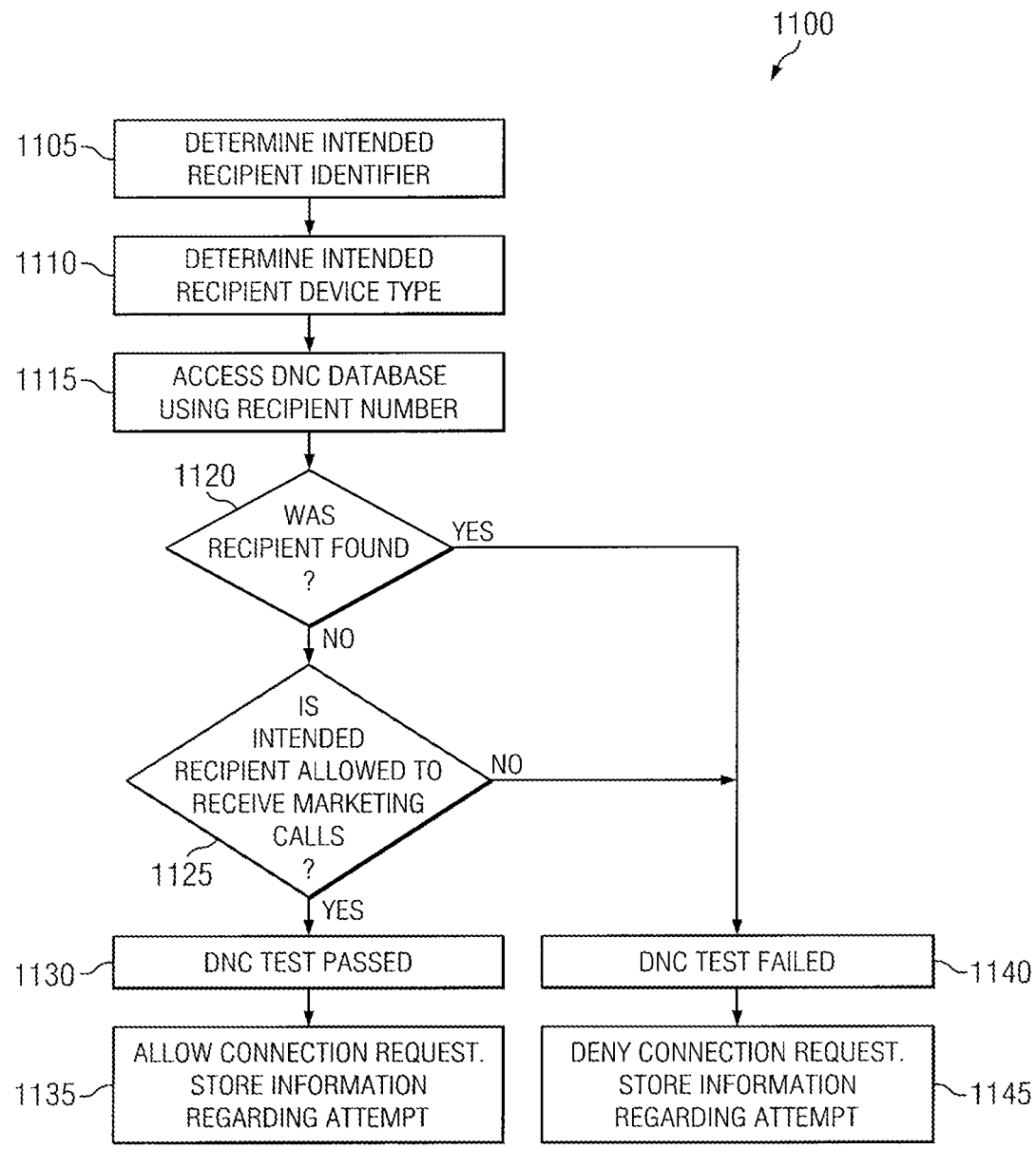
FIG. 11 is an illustration of an example embodiment of a method 1100 for determining whether or not an intended recipient of a telephony connection request should be called.

FIG. 11 is an illustration of an example embodiment of a method 1100 for determining whether or not an intended recipient of a telephony connection request should be called. Method 1100 may implement fully or in part step 925 of FIG. 9. Method 1100 may be conducted to determine, for example, whether the intended recipient is on a DNC list. In another example, it may be determined whether the intended recipient is of a undesirable, unreachable, or forbidden device or service type. In one embodiment, method 1100 may be conducted on behalf of a service provider to screen outbound connection attempts to avoid calling particular classes of intended recipient or calling particular intended recipients. Such service providers may be unable to control the introduction of such connection attempts into the service provider but may yet be responsible for the financial or technical expense of forwarding the requests. The service provider through which the connection request was sent may be responsible for the expense, overhead, or penalties associated with the connection request, even though the service provider may not have originally placed the connection request into the telephony network. In another embodiment, method 1100 may be executed upon a determination that a target service provider or group of recipients is experiencing network congestion. Such network congestion may be indicative that the target service provider or group of recipients is the target of an autodialer.

In step 1105, an identifier for an intended recipient of a connection request may be determined. The identifier may be a phone number, which may be determined from the connection request. In step 1110, a device type, service type, or other classification of the intended recipient. Such classifications may include, for example, a landline, wireless phone, fax device, or text device. The classification of the intended recipient may be determined by accessing a source of information, such as a LERG database, using the identifier of the intended recipient determined in step 1105.

In step 1115, a source of information containing DNC lists may be accessed. Any suitable source of DNC information may be used. The source of information may include, for example, DNC lists issued by a service provider, government, or other entity. In some cases, DNC lists issued by service providers or government may be only available to scrub lists of phone numbers to be dialed. Thus, the source of information may include a cache of DNC list information maintained for real-time access for evaluating network requests.

In step 1120, it may be determined whether the intended recipient was found in the DNC lists in the source of information. If so, then method 1100 may proceed to step 1140. If the intended recipient was not found in the DNC lists in the source of information, then in step 1125 it may be determined whether the intended recipient is allowed to receive connection requests of the type being evaluated. The connection requests may originate from, for example, a marketer. Such a determination may be made by, for example, analyzing the type of recipient as determined in step 1110. Some types of recipients may be unable to receive the type of connection request being issued. For example, a marketing phone call may not be correctly received by a recipient having a fax type. Thus, a mismatch between the connection request type and the intended recipient type may mean that the recipient is not allowed to receive the connection request. Some types of recipients may be forbidden by, for example, service provider policy or government of authority to be contacted with a marketing call. For example, marketing phone calls might not be allowed by policy or law to be made to mobile device recipients. Thus, if a recipient has a mobile device type, the request may not be allowed to receive the connection request.

If the intended recipient is not allowed to receive the connection request, then method 1100 may proceed to step 1140. If the intended recipient is allowed to receive the connection request, then in step 1130 it may be determined that the connection request has passed the DNC test. In step 1135, the connection request may be allowed to be forwarded and information regarding the attempt may be stored. The information may be stored in a call record database which may be accessed to determine network congestion conditions.

If the intended recipient is not allowed to receive the connection request, then in step 1140 it may be determined that the connection request has failed the DNC test. In step 1145 the connection request may be denied. The information may be stored in a call record database, which may be accessed to determine network congestion conditions. Any suitable corrective action may be taken, such as sending an error or a spoofed reply to the originator. The spoofed reply may not accurately reflect the outcome of the attempt. The spoofed reply may implicitly or explicitly indicate that the connection request was forwarded. In one embodiment, an SIP code "487" denial may be generated and sent to the originator. Subsequent connection requests from the originator may be throttled, denied, or replied to with a spoofed response. Such connection requests may be denied without forwarding the connection request to the intended recipient.

Figure 12:
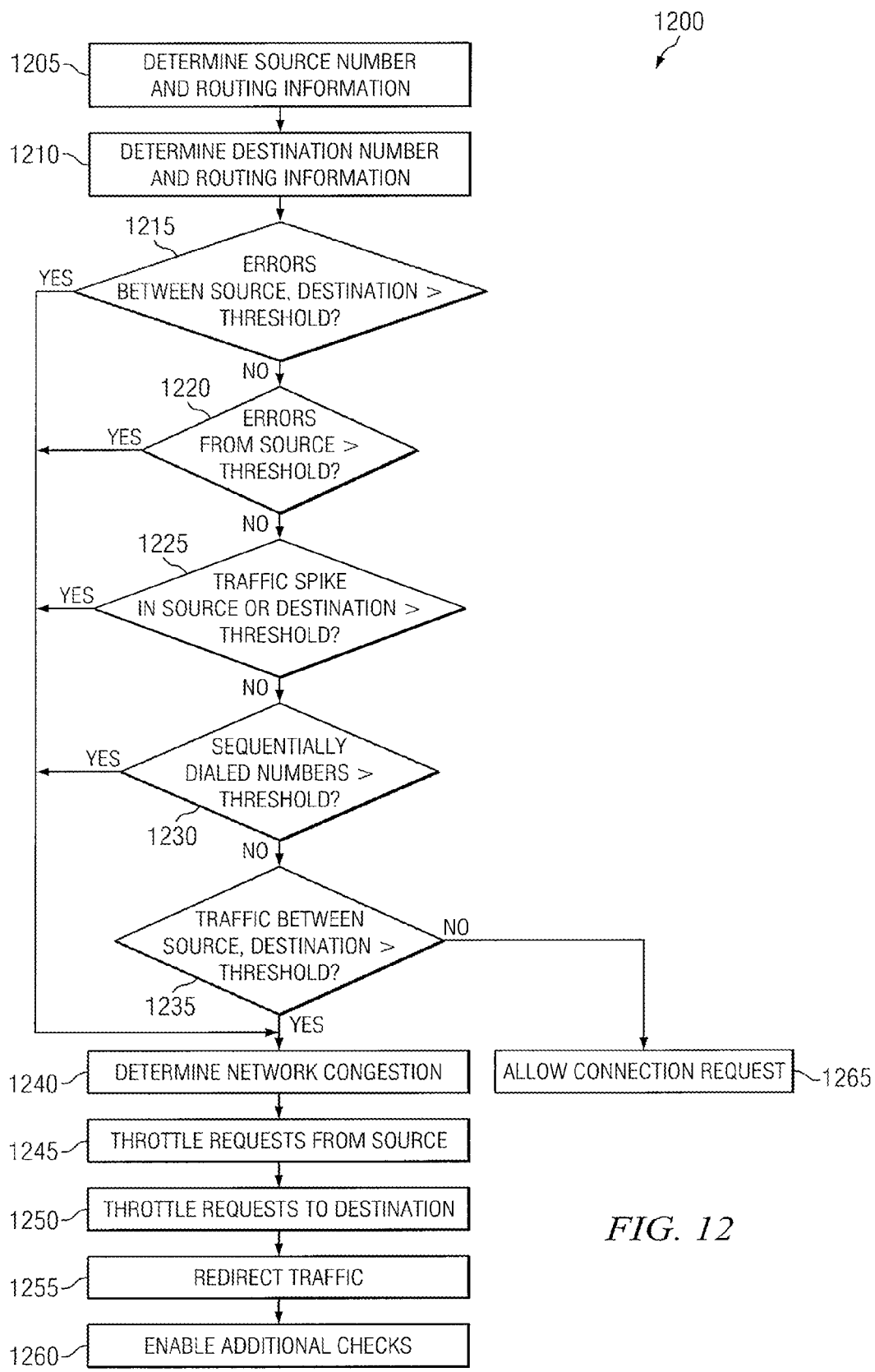
FIG. 12 is an illustration of an example embodiment of a method for determining whether or not network congestion exists with regards to an intended recipient of a telephony connection request.

FIG. 12 is an illustration of an example embodiment of a method 1200 for determining whether or not network congestion exists with regards to an intended recipient of a telephony connection request. Method 1200 may implement fully or in part step 945 of FIG. 9. Method 1200 may be conducted to determine, for example, whether congestion already exists with regards to the intended recipient or whether the addition of the intended request will cause network congestion. The congestion may be the result of, for example, excessive connection requests. The excessive connection requests may be an indication or related to an autodialer. Further, method 1200 may be conducted to determine whether any network policies of the intended recipient have been previously violated. As such, while the network of the intended recipient may not be experiencing measurable network congestion, additional connection requests that are associated with previous violation may be treated as if the connection requests are causing congestion.

In step 1205, a source number and source routing information associated with a received connection request may be determined. In step 1210, a destination number and destination routing information associated with the received request may be determined. The source number and destination number may include a phone number. The routing information may include identification of network components, switches, exchanges, or other portions of a source network that has provided the connection request. Such routing information may include, for example, an OCN number.

In step 1215, it may be determined whether the number of errors generated by connection requests between a given source and a given destination has exceeded a specified threshold. The given source and given destination may be chosen from any suitable combination thereof. The source may be defined in terms of, for example, a number or routing information. In addition, the destination may be defined in terms of, for example, a number or routing information. The threshold may be defined, for example, in terms of an absolute number of errors, errors per specified time period, or a percentage of errors within a specified time period. The errors may include, for example, short-duration calls, prevented connection requests, or error messages from connection requests failing to reach intended recipients. If the errors generated by connections between the given source and given destination exceed the specified threshold, then method 1200 may proceed to step 1240. Otherwise, method 1200 may proceed to step 1220.

In step 1220, it may be determined whether the number of errors generated by connection requests from a given source has exceeded a specified threshold. The given source may be defined in terms of, for example, a number or routing information. The threshold may be defined, for example, in terms of an absolute number of errors, errors per specified time period, or a percentage of errors within a specified time period. The analysis of step 1220 may be similar to the analysis of step 1215. However, the analysis of step 1220 may not be restricted to errors generated from calls between a given source and a given destination, but be made of any errors generated from a given source. If the errors generated by connections from the given source exceed the specified threshold, then method 1200 may proceed to step 1240. Otherwise, method 1200 may proceed to step 1225. In one embodiment, step 1220 may be conducted by evaluating whether the number of errors generated by connection requests to a given destination has exceeded a specified threshold.

In step 1225, it may be determined whether a traffic spike has occurred in connection requests from a given source or to a given destination. Such a traffic spike may be defined by whether the connection attempts have been made to or from the given source or destinations has exceeded a given threshold. The source or destination may include, for example, a number or routing information. The spike threshold may be defined, for example, in terms of an absolute number of connection requests, connection requests per given time period, or a percentage increase of connection requests. In one embodiment, step 1225 may be conducted considering the effect of the present connection request in the calculations. In another embodiment, step 1225 may be conducted using historical call information without considering the effect of the present connection request. If the traffic spike exceeds the given threshold, then method 1200 may proceed to step 1240. Otherwise, method 1200 may proceed to step 1230.

In step 1230, it may be determined whether the connection request is part of a larger quantity of connection requests attempting to contact destinations in a sequential order. The determination may include determining whether historical information reflects a pattern of destination numbers being called, and whether the present connection request would exceed a given threshold of allowed sequential calls. The sequential order of destinations may be defined by the destination number and may include any suitable pattern of calling. For example, sequentially numbered destination numbers (555-555-1111 . . . 555-555-1112) may be contacted in succession. The pattern of attempted calls may include forward or reverse progression of numbers. Furthermore, the pattern of attempted calls may skip numbers in a repeating manner, such as calling every other or every third sequentially ordered destination number. If the number of sequentially attempted destination numbers exceeds the given threshold, then method 1200 may proceed to step 1240. Otherwise, method 1200 may proceed to step 1235.

In step 1235, it may be determined whether the traffic between a given source and a given destination has exceeded a specified threshold. The source and destination may be defined by, for example, a number or routing information. The specified threshold may be defined in terms of, for example, absolute number of connection requests, connection requests per given time period, percentage of traffic for the given source or destination, or percentage of overall traffic. If the traffic between the given source and destination exceeds the specified threshold, then method 1200 may proceed to step 1240. Otherwise, method 1200 may proceed to step 1265.

In step 1240, it may have been determined that network congestion exists with respect to the connection request. In one embodiment, such network congestion may have been determined to exist without regards to the characteristics of the present connection request. In another embodiment, such network congestion may have been determined to exist if the present connection request is forwarded to the destination. In response to a determination of network congestion, any suitable action may be made, such as those described in steps 1245-1260. The particular action taken may be made based upon the particular determinations in steps 1215-1235. The connection request may be denied and not forwarded to the destination.

In step 1245, connection requests from the source of the present connection request may be throttled. The source may be defined in terms of a source number or routing information. The connection requests originating from the source may be denied for a certain length of time. Thus, subsequent connection requests may also be denied. Further, a percentage of the connection requests originating from the source may be denied, while the remainder are allowed to be forwarded to the destination.

In step 1250, connection requests to the intended destination of the present connection request may be throttled. The destination may be defined in terms of a destination number or routing information. The connection requests to the destination may be denied for a certain length of time. Further, a percentage of the connection requests intended for the destination may be denied, while the remainder are allowed to be forwarded to the destination.

In step 1255, the connection request may be redirected along alternative routing or network paths. The alternative route or network path may include network equipment or links, for example, configured for lower priority traffic, configured for less guaranteed availability, belonging to other entities, or configured for metered traffic to the sender.

In step 1260, additional testing may be enabled. The additional testing may be resource intensive and thus enabling the testing only upon congestion detection may more efficiently employ the testing techniques. Additional testing may include other determinations of whether a sender of the connection request is an autodialer or otherwise sending excessive connection requests. For example, ANI testing, such as detailed in FIG. 10, or forward-looking tests, such as detailed below in FIG. 13, may be enabled upon the detection of congestion associated with the connection request. In another example, certain tests of method 1200, such as the sequentially dialed number determination in step 1230, may be enabled upon congestion detection by other steps.

In step 1265, it may have been determined that the connection request is not associated with congestion conditions. Consequently, the connection request may be allowed.

Figure 13:
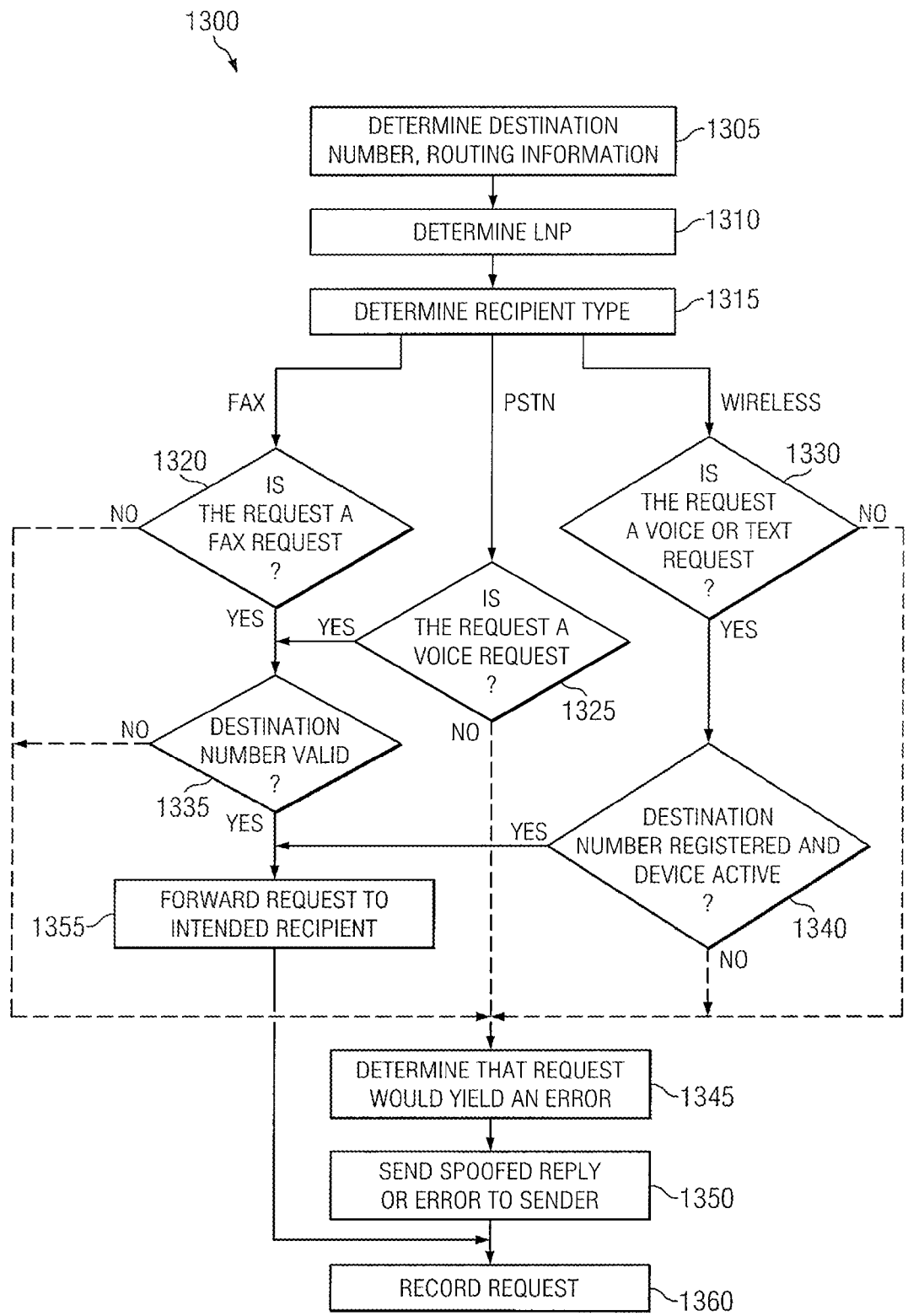
FIG. 13 is an illustration of an example embodiment of a method for determining whether or not a connection request is likely to return an error if the connection request were to be forwarded to the intended recipient.

FIG. 13 is an illustration of an example embodiment of a method 1300 for determining whether or not a connection request is likely to return an error if the connection request were to be forwarded to the intended recipient. Forwarding such a connection request and the associated error-processing may unnecessarily waste significant resources. Consequently, tests may be made to predict whether the connection request would fail. Such tests may include, for example, whether the connection request is compatible with the intended recipient, whether the recipient is a valid working number, and whether the recipient is active on registered on the network.

In step 1305, the destination number and destination routing information for a received connection request may be determined. The destination number may include a phone number. The routing information may include identification of network components, switches, exchanges, or other portions of a source network that has provided the connection request. Such routing information may include, for example, an OCN number.

In step 1310, local number portability may be determined. If the device, provider, or other aspect of an intended recipient has changed, the new device, provider, or other aspect may be determined. Local number portability may be determined through any suitable process. Information specific to the device may be determined, such as a number used locally within a provider or an exchange to identify the recipient that is different than the generally available number by which a caller makes a connection request to the recipient.

In step 1315, the type of recipient may be determined. While FIG. 13 illustrates three options—fax, PSTN, or Wireless—any other suitable type may be used. The type of recipient may be determined in any suitable manner, such as looking up the destination number in a LERG database. Furthermore, alternative numbers determined by local number portability may be used to determine the type of recipient. Subsequent to determining the type of recipient, the type of request or the type of the sender of the request may be determined and compared with the recipient type. Some types of connection requests may be incompatible with certain categories of recipients. Sending such a connection request might yield an error. Thus any suitable process may be used to determine whether the request is compatible with the recipient type. In the example of FIG. 13, if the recipient is a fax device, method 1300 may proceed to step 1320. If the recipient is a PSTN device, method 1300 may proceed to step 1325. If the recipient is a wireless device, method 1300 may proceed to step 1325.

In step 1320, it may be determined whether the request is fax request or otherwise compatible with a fax recipient. Such a determination may be made by, for example, examining header information in the request or determining the type of the sender by examining a LERG database for the sender's phone number. If the request is not a fax request or is otherwise incompatible with a fax recipient, then method 1300 may proceed to step 1345. Otherwise, if the request is a fax request or is otherwise compatible with a fax recipient then method 1300 may proceed to step 1335.

In step 1320, it may be determined whether the request is a voice request or otherwise compatible with a fax recipient. Such a determination may be made by, for example, examining header information in the request or determining the type of the sender by examining a LERG database for the sender's phone number. If the request is not a voice request or is otherwise incompatible with a voice or PSTN recipient, then method 1300 may proceed to step 1345. Otherwise, if the request is a fax request or is otherwise compatible with a fax recipient then method 1300 may proceed to step 1335.

In step 1330, it may be determined whether the request is voice request, text request, or otherwise compatible with a wireless recipient. Such a determination may be made by, for example, examining header information in the request or determining the type of the sender by examining a LERG database for the sender's phone number. If the request is not voice request, text request, or otherwise compatible with a wireless recipient, then method 1300 may proceed to step 1345. Otherwise, if the request is a fax request or is otherwise compatible with a fax recipient then method 1300 may proceed to step 1340.

In step 1335, it may be determined whether the destination number is valid. The determination may be made in any suitable manner. Some methods of making the determination may be indirect. For example, the destination number may be looked up in an LIDB to determine billing address information. If no billing address is found in the LIDB for the destination number, it may be determined that the destination number is not valid. However, if a billing address is found in the LIDB, then it may be determined that the destination number is valid. If the destination number is valid, then method 1300 may proceed to step 1355. Otherwise, method 1300 may proceed to step 1345.

In step 1340, it may be determined whether the destination number is registered and the device is active. The determination may be made in any suitable manner. For example, whether a destination number is valid and registered may be determined by examining an HLR database. Further, whether the device is active on a network and available to receive the connection request may be determined by cross-referencing the HLR information with a VLR database. If the destination number is registered and the device is active, then method 1300 may proceed to step 1355. Otherwise, method 1300 may proceed to step 1345.

In step 1345, it may have been determined that sending the connection request will return an error. In step 1350, the connection request may be denied. A spoofed reply or an error may be sent to the sender. Method 1300 may proceed to step 1360.

In step 1355, it may have been determined that sending the connection request is likely to succeed. The connecting request may be forwarded to the intended recipient.

In step 1360, the results of the analysis and determinations of method 1300 may be recorded. Such information may be used as historical information for subsequent determinations of, for example, congestion or determinations of autodialers.

Figure 14:
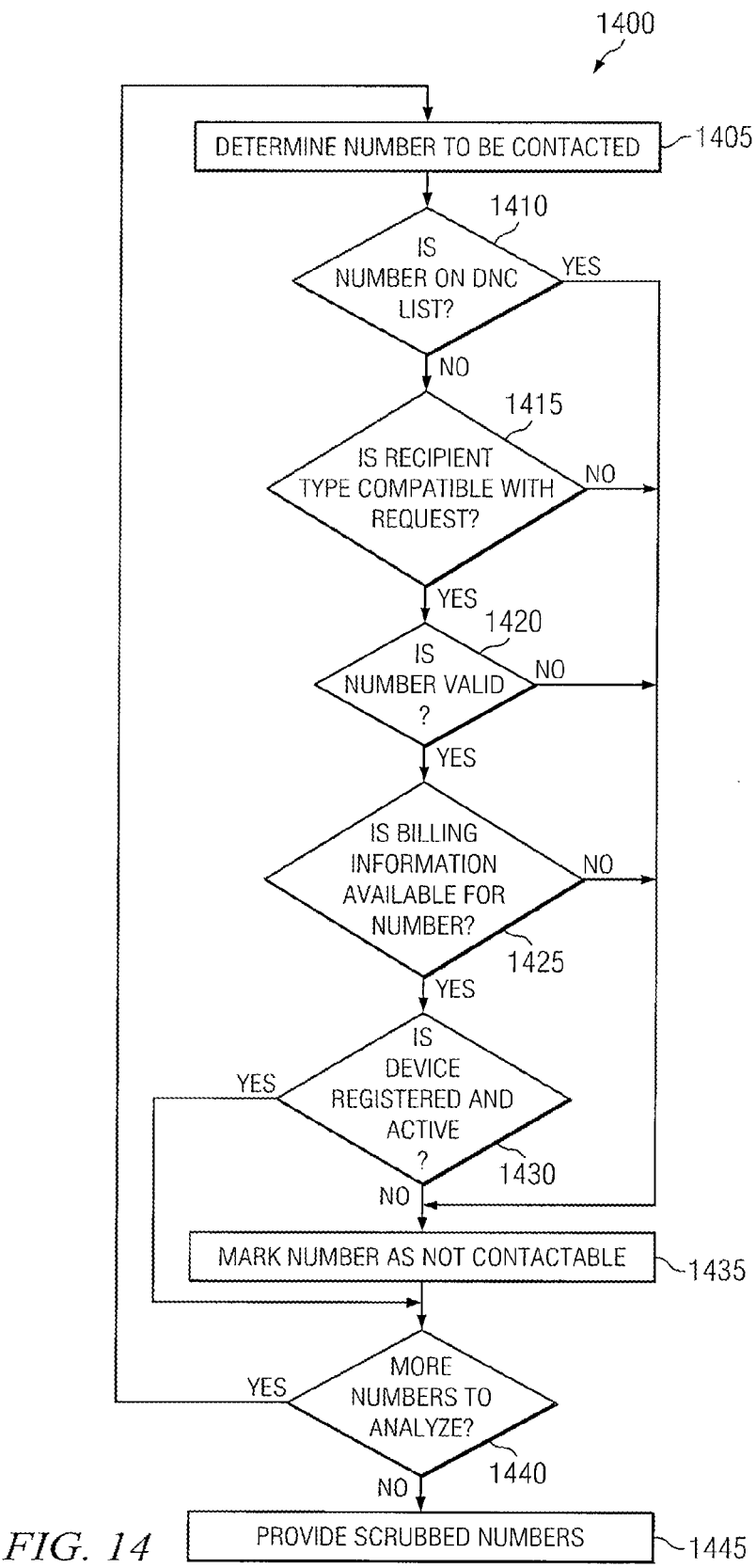
FIG. 14 is an illustration of an example embodiment of a method for determining whether or not connection requests should be made for elements of a given set of destination numbers.

FIG. 14 is an illustration of an example embodiment of a method 1400 for determining whether or not connection requests should be made for elements of a given set of destination numbers. Such a set of destination numbers may reflect potential recipients to be contacted. Method 1400 may be performed as a service for telemarketers or providers of a connection request sender network. The set of destination numbers may be received as a file, record, data structure, or other suitable mechanism. As elements within the set are verified or eliminated, the elements may be marked, removed, or otherwise managed according to the needs of a subsequent user of the set to contact recipients. Any suitable number or combination of tests or determinations may be made to verify the contents of the set of destination numbers as valid recipients.

In step 1405, a number in the set to be contacted with a connection request may be determined. In step 1410, it may be determined whether the destination number is on a DNC list. Step 1410 may be implemented fully or in part by method 1100 of FIG. 11. If the destination number is on a DNC list, then method 1400 may proceed to step 1435.

If the destination is not on a DNC list, then in step 1415 it may be determined whether the recipient type is compatible with the sender or the connection request. Step 1415 may be implemented fully or in part by method 1300 of FIG. 13, including such steps as 1315-1330. If the recipient type is not compatible with the sender or the connection request, then method 1400 may proceed to step 1435.

If the recipient type is not compatible with the sender or the connection request, then in step 1420 it may be determined whether the destination number is valid. Step 1420 may be implemented fully or in part by method 1300 of FIG. 13, including such steps as 1335. If the destination number is not valid, then method 1400 may proceed to step 1435.

If the destination number is valid, then in step 1425 it may be determined whether the destination number has billing information. Step 1425 may be implemented fully or in part by method 1300 of FIG. 13, including such steps as 1335 or 1340. If the destination number does not have billing information, then method 1400 may proceed to step 1435.

If the destination number does not have billing information, then in step 1430 it may be determined whether the target device is registered on a network and active. Step 1430 may be implemented fully or in part by method 1300 of FIG. 13, including such steps as 1340. If the target device is not registered on a network and active, then method 1400 may proceed to step 1435. If the target device is registered on a network and active, then the destination number may be allowed or otherwise marked as available to be contacted. Method 1400 may proceed to step 1440.

In step 1435, it may have been determined that the number should not be included in the set of numbers available to be contacted. The destination number may be, for example, marked accordingly in the set or removed altogether.

In step 1440, it may be determined whether additional destination numbers in the set need to be evaluated. If so, method 1400 may repeat at step 1405. If not, then in step 1445 a list of the destination numbers, scrubbed for numbers not to call, may be provided to a client.

Methods 900, 1000, 1100, 1200, 1300, and 1400 may be implemented using the system of FIGS. 1-8, or any other system operable to implement methods 900, 1000, 1100, 1200, 1300, and 1400. As such, the preferred initialization point for methods 900, 1000, 1100, 1200, 1300, and 1400 and the order of its steps may depend on the implementation chosen. In some embodiments, some steps may be optionally omitted, repeated, or combined. In some embodiments, some steps of methods 900, 1000, 1100, 1200, 1300, and 1400 may be executed in parallel with other steps of methods 900, 1000, 1100, 1200, 1300, and 1400. In certain embodiments, methods 900, 1000, 1100, 1200, 1300, and 1400 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method, comprising:
    determining addressing information regarding a telephony connection request, the addressing information comprising at least routing information or a phone number;
    determining traffic information regarding the telephony connection request based on the addressing information, the traffic information comprising previous telephony connection requests;
    sending a reply in response to the telephony connection request when the telephony connection request forwarded to an intended recipient would result in a system response;
    determining whether to forward the telephony connection request; and
    not forwarding the telephony connection request when the request would be unsuccessful, the request is associated with behavior indicative of an auto-dialer, or the request violates a policy of a network service.

2. The method of claim 1, further comprising comparing the traffic information to a threshold.

3. The method of claim 2, wherein the threshold is based on at least one of:
    traffic between the sender of the telephony connection request and the intended recipient;
    one or more errors resulting from the previous telephony connection requests;
    one or more short duration calls resulting from the previous telephony connection requests, wherein a short duration call comprises a connection with a duration less than a call duration threshold; and
    a number of intended recipients contacted in sequence as part of the previous telephony connection requests.

4. The method of claim 1, wherein the reply comprises an indication that the telephony connection request has been forwarded to the intended recipient and wherein the reply differs from the system response.

5. The method of claim 1, further comprising denying one or more subsequent telephony connection requests associated with the telephony connection requests.

6. The method of claim 5, further comprising throttling the subsequent telephony connection requests.

7. The method of claim 5, wherein the subsequent telephony connection requests are denied based on at least one of:
   the intended recipient of the telephony connection request; and
   the sender of the telephony connection request.

8. The method of claim 1, further comprising, based on the comparison, at least one of:
   determining that the telephony connection request would result in undesired network traffic;
   determining an alternative route to the intended recipient; and
   sending the telephony connection request to the intended recipient on the alternative route.

9. A non-transitory computer readable storage medium comprising instructions that, when read by a processor, are configured to cause the processor to:
   determine addressing information regarding a telephony connection request, the addressing information comprising at least routing information or a phone number;
   determine traffic information regarding the telephony connection request based on the addressing information, the traffic information comprising previous telephony connection requests;
   send a reply in response to the telephony connection request when the telephony connection request forwarded to an intended recipient would result in a system response;
   determine whether to forward the telephony connection request; and
   not forward the telephony connection request when the request would be unsuccessful, the request is associated with behavior indicative of an auto-dialer, or the request violates a policy of a network service.

10. The non-transitory computer readable storage medium of claim 9 further comprising instructions that, when read by the processor, are configured to cause the processor to compare the traffic information to a threshold.

11. The non-transitory computer readable storage medium of claim 10, wherein the threshold is based on at least one of:
   traffic between the sender of the telephony connection request and the intended recipient;
   one or more errors resulting from the previous telephony connection requests;
   one or more short duration calls resulting from the previous telephony connection requests, wherein a short duration call comprises a connection with a duration less than a call duration threshold; and
   a number of intended recipients contacted in sequence as part of the previous telephony connection requests.

12. The non-transitory computer readable storage medium of claim 9, wherein the reply comprises an indication that the telephony connection request has been forwarded to the intended recipient and wherein the reply differs from the system response.

13. The non-transitory computer readable storage medium of claim 9, further comprising instructions that, when read by the processor, are configured to cause the processor to deny one or more subsequent telephony connection requests associated with the telephony connection requests.

14. The non-transitory computer readable storage medium of claim 13, further comprising instructions that, when read by the processor, are configured to cause the processor to throttle the subsequent telephony connection requests.

15. The non-transitory computer readable storage medium of claim 13, wherein the subsequent telephony connection requests are denied based on at least one of:
   the intended recipient of the telephony connection request; and
   the sender of the telephony connection request.

16. The non-transitory computer readable storage medium of claim 10, further comprising instructions that, when read by the processor, are configured to cause the processor to perform, based on the comparison, at least one of:
   determining that the telephony connection request would result in undesired network traffic;
   determining an alternative route to the intended recipient; and
   sending the telephony connection request to the intended recipient on the alternative route.

17. A system, comprising:
   a processor; and
   memory, wherein
   the processor and the memory are communicably coupled to one another, and
   the processor is configured to:
      determine addressing information regarding a telephony connection request, the addressing information comprising at least routing information or a phone number,
      determine traffic information regarding the telephony connection request based on the addressing information, the traffic information comprising previous telephony connection requests,
      send a reply in response to the telephony connection request, when the telephony connection request forwarded to an intended recipient would result in a system response,
      determine whether to forward the telephony connection request; and
      not forward the telephony connection request when the request would be unsuccessful, the request is associated with behavior indicative of an auto-dialer, or the request violates a policy of a network service.

18. The system of claim 17, wherein the processor is further configured to compare the traffic information to a threshold.

19. The system of claim 18, wherein the threshold is based on at least one of:
   traffic between the sender of the telephony connection request and the intended recipient;
   one or more errors resulting from the previous telephony connection requests;
   one or more short duration calls resulting from the previous telephony connection requests, wherein a short duration call comprises a connection with a duration less than a call duration threshold; and
   a number of intended recipients contacted in sequence as part of the previous telephony connection requests.

20. The system of claim 17, wherein the reply comprises an indication that the telephony connection request has been forwarded to the intended recipient and wherein the reply differs from the system response.

* * * * *